(12) United States Patent
Yang et al.

(10) Patent No.: US 12,342,065 B2
(45) Date of Patent: Jun. 24, 2025

(54) ELECTRONIC DEVICE INCLUDING REFLECTOR AND LENS ASSEMBLY

(71) Applicant: Samsung Electronics Co., Ltd., Suwon-si (KR)

(72) Inventors: Kyungdong Yang, Suwon-si (KR); Soonae Kim, Suwon-si (KR); Jaemyung Lee, Suwon-si (KR); Hokeun Kwak, Suwon-si (KR); Yongkwan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 261 days.

(21) Appl. No.: 18/152,592

(22) Filed: Jan. 10, 2023

(65) Prior Publication Data

US 2023/0164420 A1 May 25, 2023

Related U.S. Application Data

(63) Continuation of application No. PCT/KR2022/005430, filed on Apr. 14, 2022.

(30) Foreign Application Priority Data

Apr. 14, 2021 (KR) .................. 10-2021-0048503

(51) Int. Cl.
*H04N 23/58* (2023.01)
*H04N 23/71* (2023.01)
(Continued)

(52) U.S. Cl.
CPC ............ *H04N 23/58* (2023.01); *H04N 23/71* (2023.01); *H04N 23/75* (2023.01); *H04N 23/80* (2023.01)

(58) Field of Classification Search
CPC .............................. H04N 23/58; H04N 25/71
(Continued)

(56) References Cited

U.S. PATENT DOCUMENTS 7,408,576 B2    8/2008    Pinto et al.
7,965,931 B2    6/2011    Cho et al.
(Continued)

FOREIGN PATENT DOCUMENTS

JP    2005-536148 A    11/2005
JP    2012-018277 A    1/2012
(Continued)

OTHER PUBLICATIONS

International Search Report and Written Opinion of the International Searching Authority dated Aug. 3, 2022, in connection with International Application No. PCT/KR2022/005430, 10 pages.

*Primary Examiner* — Anthony J Daniels

(57) ABSTRACT

An electronic device of the disclosure may include a camera module including a lens assembly, a reflector for changing a field of view, a Hall sensor for identifying a position of the reflector, and a first memory for storing a first correction value for correcting shading by the lens assembly, a second memory for storing reflector shading correction, and a processor. The processor may obtain a first image frame by driving the camera module, obtain first Hall data corresponding to the position of the reflector through the Hall sensor while the first image frame is obtained through the camera module, obtain the first correction value from the first memory, obtain a second correction value corresponding to the first Hall data among the reflector shading correction values from the second memory, and perform shading correction on the first image frame based on the first correction value and the second correction value.

20 Claims, 16 Drawing Sheets

| ROI2 | col1 | col2 | col3 | col4 | col5 | col6 | col7 |
|---|---|---|---|---|---|---|---|
| row1 | 79.9 | 87.3 | 91 | 92.6 | 91 | 86.7 | 78.4 |
| row2 | 85.2 | 91.7 | 96.3 | 98.1 | 95.7 | 91.4 | 84.6 |
| row3 | 88.3 | 94.8 | 100 | 102 | 99.4 | 94.4 | 87.7 |
| row4 | 86.7 | 93.2 | 97.8 | 100 | 97.5 | 92.9 | 86.4 |
| row5 | 83.3 | 89.5 | 94.1 | 96 | 93.8 | 89.5 | 83 |
| row6 | 79.3 | 85.5 | 89.5 | 91 | 89.2 | 85.2 | 78.7 |
| row7 | 74.7 | 81.5 | 84.9 | 85.8 | 84.6 | 80.9 | 72.5 |

Shading profile data (910)

| ROI2 | col1 | col2 | col3 | col4 | col5 | col6 | col7 |
|---|---|---|---|---|---|---|---|
| row1 | 1.31 | 1.20 | 1.15 | 1.13 | 1.15 | 1.21 | 1.33 |
| row2 | 1.22 | 1.13 | 1.07 | 1.05 | 1.08 | 1.13 | 1.22 |
| row3 | 1.17 | 1.09 | 1.03 | 1.01 | 1.04 | 1.10 | 1.18 |
| row4 | 1.15 | 1.07 | 1.02 | 1.00 | 1.03 | 1.08 | 1.16 |
| row5 | 1.18 | 1.10 | 1.04 | 1.03 | 1.05 | 1.10 | 1.19 |
| row6 | 1.24 | 1.16 | 1.10 | 1.09 | 1.11 | 1.16 | 1.26 |
| row7 | 1.34 | 1.24 | 1.19 | 1.17 | 1.19 | 1.24 | 1.39 |

First correction value (710)

=

| ROI2 | col1 | col2 | col3 | col4 | col5 | col6 | col7 |
|---|---|---|---|---|---|---|---|
| row1 | 105 | 105 | 105 | 105 | 105 | 105 | 105 |
| row2 | 104 | 103 | 103 | 103 | 103 | 104 | 103 |
| row3 | 103 | 103 | 103 | 103 | 103 | 103 | 103 |
| row4 | 100 | 100 | 100 | 100 | 100 | 100 | 101 |
| row5 | 98 | 98 | 98 | 98 | 99 | 99 | 99 |
| row6 | 99 | 99 | 99 | 99 | 99 | 99 | 99 |
| row7 | 100 | 101 | 101 | 100 | 101 | 101 | 100 |

(915)

| ROI2 | col1 | col2 | col3 | col4 | col5 | col6 | col7 |
|---|---|---|---|---|---|---|---|
| row1 | 105 | 105 | 105 | 105 | 105 | 105 | 105 |
| row2 | 104 | 103 | 103 | 103 | 103 | 104 | 103 |
| row3 | 103 | 103 | 103 | 103 | 103 | 103 | 103 |
| row4 | 100 | 100 | 100 | 100 | 100 | 100 | 101 |
| row5 | 98 | 98 | 98 | 98 | 99 | 99 | 99 |
| row6 | 99 | 99 | 99 | 99 | 99 | 99 | 99 |
| row7 | 100 | 101 | 101 | 100 | 101 | 101 | 100 |

(915)

| ROI2 | col1 | col2 | col3 | col4 | col5 | col6 | col7 |
|---|---|---|---|---|---|---|---|
| row1 | 0.94 | 0.94 | 0.94 | 0.94 | 0.94 | 0.94 | 0.94 |
| row2 | 0.97 | 0.97 | 0.97 | 0.98 | 0.97 | 0.97 | 0.97 |
| row3 | 0.99 | 0.99 | 0.99 | 0.99 | 0.99 | 0.99 | 0.99 |
| row4 | 0.98 | 0.99 | 1.00 | 1.00 | 1.00 | 0.99 | 0.98 |
| row5 | 1.00 | 1.01 | 1.01 | 1.01 | 1.01 | 1.01 | 1.00 |
| row6 | 1.01 | 1.02 | 1.02 | 1.02 | 1.02 | 1.02 | 1.01 |
| row7 | 1.01 | 1.00 | 1.00 | 1.00 | 1.00 | 1.00 | 1.01 |

Second correction value (920)

=

| ROI2 | col1 | col2 | col3 | col4 | col5 | col6 | col7 |
|---|---|---|---|---|---|---|---|
| row1 | 98 | 99 | 98 | 99 | 98 | 98 | 98 |
| row2 | 100 | 100 | 100 | 101 | 100 | 100 | 100 |
| row3 | 102 | 102 | 102 | 102 | 102 | 103 | 102 |
| row4 | 98 | 99 | 100 | 100 | 100 | 99 | 99 |
| row5 | 98 | 99 | 99 | 99 | 99 | 99 | 99 |
| row6 | 100 | 101 | 100 | 101 | 100 | 101 | 100 |
| row7 | 101 | 101 | 100 | 100 | 100 | 101 | 101 |

(925)

(51) Int. Cl.
*H04N 23/75* (2023.01)
*H04N 23/80* (2023.01)

(58) Field of Classification Search
USPC .......................................................... 348/251
See application file for complete search history.

(56) References Cited

U.S. PATENT DOCUMENTS

| | | | |
|---|---|---|---|
| 8,717,683 | B2 | 5/2014 | Toyoda et al. |
| 9,489,881 | B2 | 11/2016 | Yanagi |
| 10,070,060 | B2 | 9/2018 | Goldenberg et al. |
| 2004/0233305 | A1 | 11/2004 | Morishita |
| 2008/0309772 | A1 | 12/2008 | Ikeda |
| 2010/0149387 | A1* | 6/2010 | Tsuda ..................... H04N 23/84 |
| | | | 348/E9.037 |
| 2012/0008214 | A1 | 1/2012 | Toyoda et al. |
| 2013/0321678 | A1 | 12/2013 | Cote et al. |
| 2014/0184813 | A1 | 7/2014 | Cohen et al. |
| 2015/0296127 | A1* | 10/2015 | Kudo ..................... H04N 25/61 |
| | | | 348/251 |
| 2016/0182794 | A1* | 6/2016 | Aoki ..................... H04N 25/626 |
| | | | 348/229.1 |
| 2016/0316155 | A1 | 10/2016 | Richards |
| 2018/0067335 | A1* | 3/2018 | Chen ..................... H04N 23/686 |
| 2019/0158744 | A1* | 5/2019 | Saito ..................... H04N 19/50 |
| 2020/0236255 | A1* | 7/2020 | Takahashi ............... G03B 17/14 |
| 2021/0400193 | A1* | 12/2021 | Ma ....................... H04N 5/2624 |
| 2022/0004018 | A1 | 1/2022 | Kang et al. |
| 2022/0046151 | A1* | 2/2022 | Shabtay ................. H04N 23/54 |

FOREIGN PATENT DOCUMENTS

| | | |
|---|---|---|
| JP | 2017-085443 A | 5/2017 |
| KR | 10-2006-0068497 A | 6/2006 |
| KR | 10-2009-0027338 A | 3/2009 |
| KR | 10-2010-0041366 A | 4/2010 |
| KR | 10-2017-0128612 A | 11/2017 |
| KR | 10-2020-0053958 A | 5/2020 |

\* cited by examiner

| 76.4 | 83.1 | 87.1 | 88.5 | 86.8 | 82.9 | 75 |
|------|------|------|------|------|------|------|
| 82.3 | 88.8 | 93.3 | 94.9 | 92.7 | 88.2 | 81.7 |
| 85.4 | 91.9 | 96.9 | 98.6 | 96.3 | 91.3 | 84.8 |
| 86.8 | 93.3 | 98 | 100 | 97.5 | 92.7 | 86 |
| 84.8 | 91 | 95.8 | 97.5 | 95.2 | 90.7 | 84 |
| 80.3 | 86.5 | 90.7 | 92.1 | 90.4 | 86 | 79.5 |
| 74.4 | 80.9 | 84.3 | 85.4 | 84 | 80.3 | 72.2 |

Shading profile data
(700)

| 1.31 | 1.20 | 1.15 | 1.13 | 1.15 | 1.21 | 1.33 |
|------|------|------|------|------|------|------|
| 1.22 | 1.13 | 1.07 | 1.05 | 1.08 | 1.13 | 1.22 |
| 1.17 | 1.09 | 1.03 | 1.01 | 1.04 | 1.10 | 1.18 |
| 1.15 | 1.07 | 1.02 | 1.00 | 1.03 | 1.08 | 1.16 |
| 1.18 | 1.10 | 1.04 | 1.03 | 1.05 | 1.10 | 1.19 |
| 1.24 | 1.16 | 1.10 | 1.09 | 1.11 | 1.16 | 1.26 |
| 1.34 | 1.24 | 1.19 | 1.17 | 1.19 | 1.24 | 1.39 |

First correction value
(710)

ELECTRONIC DEVICE INCLUDING REFLECTOR AND LENS ASSEMBLY

CROSS-REFERENCE TO RELATED APPLICATIONS

This application is a Bypass Continuation of International Application No. PCT/KR2022/005430, filed Apr. 14, 2022, which claims priority to Korean Patent Application No. 10-2021-0048503, filed Apr. 14, 2021, the disclosures of which are herein incorporated by reference in their entirety.

FIELD

Embodiments of the disclosure relate to an electronic device including a reflector and a lens assembly.

DESCRIPTION OF RELATED ART

An electronic device (for example, smartphone) may include a camera module obtained by making a digital camera compact. Users tend to prefer thin smartphones, and camera modules mounted within electronic devices (for example, smartphones) satisfy such user demands. However, there are restrictions on making camera modules compact while maintaining the performance, and a periscope camera may be employed accordingly. A periscope camera may include a reflector (for example, prism) capable of changing the direction of light.

SUMMARY

According to the prior art, the range of movement of a prism included in a camera module is limited within a predetermined range, thereby limiting the scan function for changing the field of view by using the camera module, for example. Therefore, a light source is imaged in a fixed prism position, thereby obtaining a single image, and a shading correction value is extracted from the image and then applied. On the other hand, the prism has recently been rotated actively, thereby utilizing the scan function. There is a problem in that, if the prism needs to be moved in a wide range (for example, about 20°-25°) through the scan function, accurate shading correction is difficult to perform by applying a single shading correction value to images acquired in various prism positions.

An electronic device according to an embodiment may include a camera module, which includes a lens assembly, a reflector configured to change a field of view by adjusting light incident toward the lens assembly, at least one Hall sensor configured to identify a position of the reflector, and a first memory configured to store a first correction value for correcting shading by the lens assembly, a second memory configured to store a reflector shading correction value and instructions for correcting shading by the reflector, wherein the reflector shading correction value has a different value depending on the position of the reflector, and at least one processor electrically connected to the camera module and the second memory. The at least one processor may be, when executing the instructions, configured to obtain a first image frame by driving the camera module, obtain first Hall data corresponding to the position of the reflector through the at least one Hall sensor while the first image frame is obtained through the camera module, obtain the first correction value from the first memory, obtain a second correction value corresponding to the first Hall data among the reflector shading correction values from the second memory, and perform shading correction on the first image frame based on the first correction value and the second correction value.

A method of operating an electronic device according to an embodiment may include obtaining a first image frame by driving a camera module included in the electronic device, obtaining first Hall data corresponding to the position of the reflector through at least one Hall sensor capable of identifying the position of the reflector included in the camera module while the first image frame is obtained through the camera module, obtaining a first correction value for correcting shading by the lens assembly from the first memory included in the camera module, obtaining a second correction value corresponding to the first Hall data among reflector shading correction values for correcting shading by the reflector from a second memory included in the electronic device, and performing shading correction on the first image frame based on the first correction value and the second correction value.

An electronic device according to an embodiment may include a camera module, which includes a lens assembly, an actuator configured to perform optical image stabilization (OIS) and optical zoom by moving the lens assembly, at least one Hall sensor configured to identify a position of the lens assembly, and a first memory configured to store a first correction value for correcting shading by the lens assembly, a second memory configured to store a shading movement correction value and instructions for correcting shading that changes as the lens assembly is moved, wherein the shading movement correction value has a different value depending on the position of the lens assembly, and at least one processor electrically connected to the camera module and the second memory. The at least one processor may be, when executing the instructions, configured to obtain a first image frame by driving the camera module, obtain first Hall data corresponding to the position of the lens assembly through the at least one Hall sensor while the first image frame is obtained through the camera module, obtain the first correction value from the first memory, obtain a second correction value corresponding to the first Hall data among the shading movement correction values from the second memory, and perform shading correction on the first image frame based on the first correction value and the second correction value.

According to various embodiments of the disclosure, an electronic device may apply a shading correction value appropriate for the position of a prism. In addition, when the electronic device rotates the prism to acquire images at various angles of view, the image brightness may be made uniform across the entire area.

According to various embodiments of the disclosure, an electronic device may store a shading correction value in a flash memory of the electronic device, as well as in a nonvolatile memory of a camera module, thereby reducing the amount of data stored in the nonvolatile memory. In addition, steps necessary for the electronic device production process may be reduced, thereby reducing production costs.

Advantageous effects obtainable from the disclosure are not limited to the above-mentioned advantageous effects, and other advantageous effects not mentioned herein will be clearly understood by those skilled in the art to which the disclosure pertains.

Before undertaking the detailed description below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts"

FIG. 7 illustrates an example of a first correction value stored in an electronic device according to an embodiment.

FIG. 8 illustrates an example of shading by a reflector in an electronic device according to an embodiment.

FIG. 11 illustrates an example of shading profile data after shading correction is performed according to an embodiment.

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
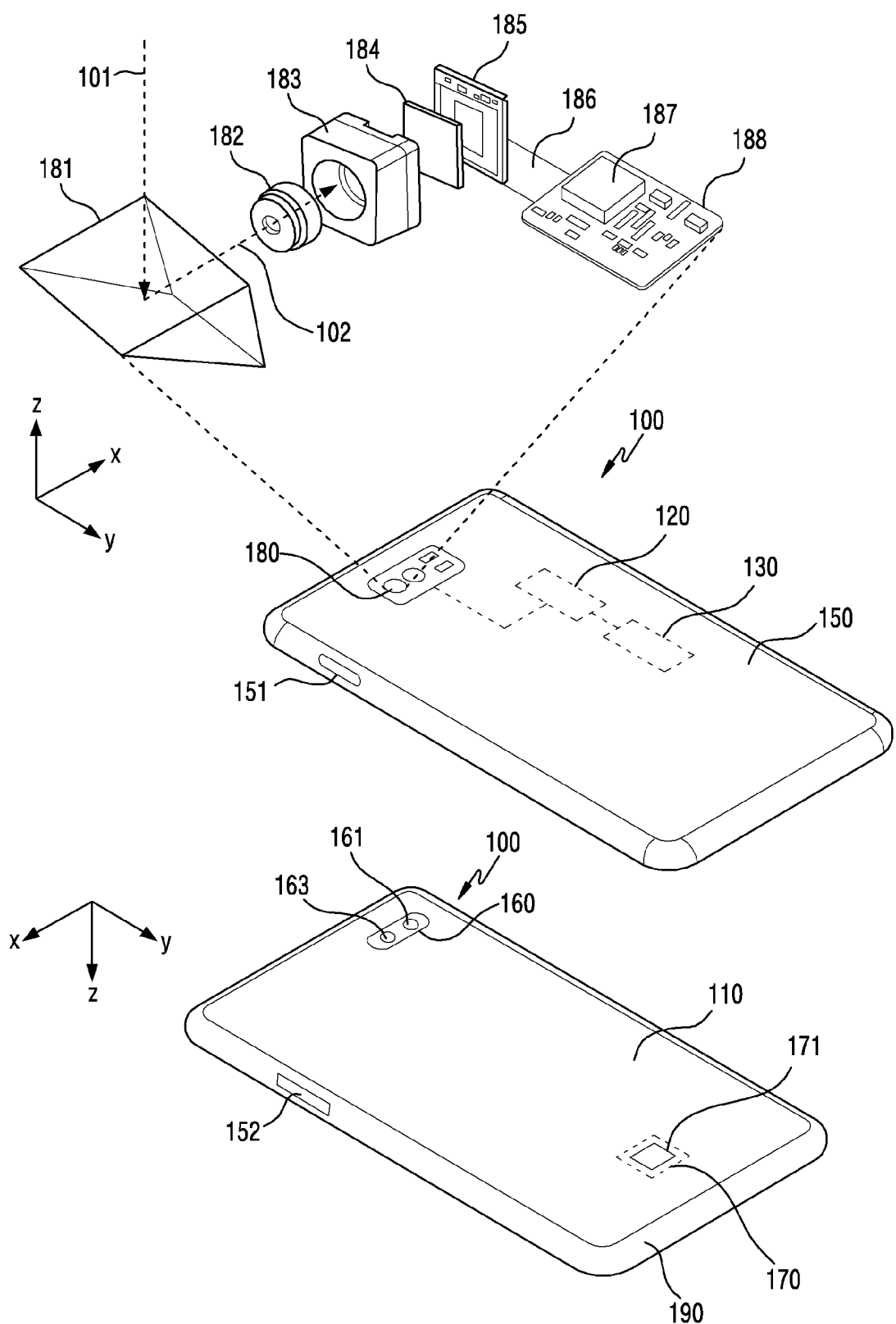
FIG. 1 illustrates an electronic device according to an embodiment.

FIG. 1 illustrates a structure of an electronic device 100 and a camera module 180 according to an embodiment.

FIG. 1 is a diagram schematically illustrating an external appearance of the electronic device 100 in which a camera module 180 is mounted and the camera module 180 according to an embodiment. Although the embodiment of FIG. 1 has been illustrated and described on the premise of a mobile device, in particular, a smart phone, it will be clearly understood by those skilled in the art that the embodiment may be applied to a camera-equipped device among various electronic devices or mobile devices.

Referring to FIG. 1, a display 110 may be disposed on a front surface of the electronic device 100 according to an embodiment. In an embodiment, the display 110 may occupy most of the front surface of the electronic device 100. The display 110 and a bezel 190 surrounding at least some edges of the display 110 may be disposed on the front surface of the electronic device 100. The display 110 may include a flat area and a curved area extending from the flat area toward the side of the electronic device 100. The electronic device 100 illustrated in FIG. 1 is an example, and various embodiments are possible. For example, the display 110 of the electronic device 100 may include only a flat area without a curved area, or may include a curved area only at one edge instead of both sides. In addition, in an embodiment, a curved area may extend toward the rear surface of the electronic device, so that the electronic device 100 may include an additional flat area.

In an embodiment, the electronic device 100 may additionally include a speaker, a receiver, a front camera, a proximity sensor, or a home key. The electronic device 100 according to an embodiment may be provided in which a rear cover 150 is integrated with the main body of the electronic device. In another embodiment, the rear cover 150 may be separated from the main body of the electronic device 100 to have a form in which the battery can be replaced. The rear cover 150 may be referred to as a battery cover or a back cover.

In an embodiment, a fingerprint sensor 171 for recognizing a user's fingerprint may be included in one area 170 of the display 110. Because the fingerprint sensor 171 is disposed on a lower area of the display 110, the fingerprint sensor 171 may not be recognized by the user or may be difficult to be recognized by the user. In addition, a sensor for additional user or biometric authentication may be disposed on an area of the display 110 in addition to the fingerprint sensor 171. In another embodiment, a sensor for user or biometric authentication may be disposed on an area of the bezel 190. For example, an IR (infrared) sensor for iris authentication may be exposed through an area of the display 110 or exposed through an area of the bezel 190.

In an embodiment, a front camera 161 may be disposed in an area 160 of the front surface of the electronic device 100. In the embodiment of FIG. 1, the front camera 161 is illustrated to be exposed through an area of the display 110, but in another embodiment, the front camera 161 may be exposed through the bezel 190. The electronic device 100 may include one or more front cameras 161. For example, the electronic device 100 may include two front cameras, such as a first front camera and a second front camera. In an embodiment, the first front camera and the second front camera may be cameras of the same type having the same specifications (e.g., pixels), but the first front camera and the second front camera may be implemented as cameras of different specifications. The electronic device 100 may support a function related to a dual camera (e.g., 3D photographing, auto focus, etc.) through two front cameras. The above-mentioned description of the front camera may be equally or similarly applied to the rear camera of the electronic device 100.

In an embodiment, the front camera 161 may be disposed on the rear surface of the area 160 of the display 110 to face the area 160. For example, the front camera 161 may be a hidden under display camera (UDC) that is not visually exposed to the area 160.

According to an embodiment, the area 160 of the display 110 that at least partially faces the front camera 161 is a part of an area for displaying content, and may be configured as a transmissive area having a specified transmittance. According to an embodiment, the transmissive area may be configured to have a transmittance in a range of about 5% to about 20%. For example, the transmissive area may include an area overlapping with an effective area (e.g., field of view (FOV)) of the front camera 161 through which light for generating an image by being imaged by an image sensor passes. For example, the transmissive area of the display 110 may include an area having lower pixel density and/or lower wiring density than the surrounding area.

In an embodiment, various hardware or sensors 163 to assist photographing, such as a flash, may be additionally disposed in the electronic device 100. For example, a distance sensor (e.g., a time of flight (TOF) sensor) for detecting a distance between a subject and the electronic device 100 may be further included. The distance sensor may be applied to both the front camera 161 and/or the rear camera. The distance sensor may be disposed separately from or included in the front camera 161 and/or the rear camera.

In an embodiment, at least one physical key may be disposed on a side portion of the electronic device 100. For example, a first function key 151 for turning on and off the display 110 or turning on and off the power of the electronic device 100 may be disposed on the right edge with respect to the front surface of the electronic device 100. In an embodiment, a second function key 152 for controlling the volume or screen brightness of the electronic device 100 may be disposed on the left edge with respect to the front surface of the electronic device 100. In addition to this, additional buttons or keys may be disposed on the front or rear surface of the electronic device 100. For example, a physical button or a touch button mapped to a specific function may be disposed in a lower area of the front bezel 190.

Referring to FIG. 1, the electronic device 100 according to an embodiment may include sensors such as at least one camera module, a flash, and a distance sensor on the rear surface (e.g., the surface facing the +z direction) of the electronic device 100. The camera module 180 may include a lens assembly 182, an AF/OIS carrier assembly 183, an infrared cut filter 184, and an image sensor 185. The camera module 180 may further include a first memory (not illustrated). The first memory will be described later with reference to FIGS. 2 and 3. In an embodiment, a processor 120 may include an image signal processor (ISP) 187 electrically connected to the image sensor 185. In embodiments of the disclosure, the image signal processor 187 may be referred to as being included in the processor 120.

In an embodiment, the lens assembly 182, the AF/OIS carrier assembly 183, and the image sensor 185 may not be disposed parallel to the direction of light incident on the electronic device 100, but may be disposed to be substantially perpendicular to the direction of light incident on the electronic device 100. For example, the lens assembly 182, the AF/OIS carrier assembly 183, and the image sensor 185 may be disposed to be substantially perpendicular to a direction 101 (e.g., −z direction) of light incident on the electronic device 100, and the thickness of the electronic device 100 may be reduced. A reflector 181 included in the camera module 180 may change the direction 101 of the incident light to the direction 102 to be reflected so that the light passes through the lens assembly 182, the AF/OIS carrier assembly 183, and the image sensor 185. For example, the reflector 181 may reflect light incident in the −z direction to change the direction of the light to the +x direction. Due to these structural characteristics, the electronic device 100 may perform shake correction by controlling the movement of the reflector 181, and may change the field of view by adjusting the light incident on the lens assembly 182. In an embodiment, the reflector 181 may include at least one of a prism and a mirror.

In an embodiment, the lens assembly 182 may have a different number, arrangement, and/or type of lenses depending on the front camera 161 and the rear camera. Depending on the type of the lens assembly 182, the front camera 161 and the rear camera may have different characteristics (e.g., focal length, maximum magnification, etc.). The lens may move forward and backward along the optical axis (e.g., 102), and may operate to change a focal length so that a target object as a subject can be clearly captured.

In an embodiment, the camera module 180 may include the lens assembly 182 that mounts at least one or more lenses aligned on an optical axis, and the AF/OIS carrier assembly 183 that at least partially surrounds the periphery of the lens assembly 182 about the optical axis.

The AF/OIS carrier assembly 183 may mount at least one coil. The camera module 180 may control the at least one coil to move the lens assembly 182 in a direction perpendicular to and/or parallel to an optical axis (e.g., 102).

In an embodiment, the infrared cut filter 184 may be disposed on the upper surface (e.g., -x direction) of the image sensor 185. The image of the subject passing through the lens may be partially filtered by the infrared cut filter 184 and then detected by the image sensor 185.

In an embodiment, the image sensor 185 may be a complementary metal oxide semiconductor (CMOS) sensor or a charged coupled device (CCD) sensor. A plurality of individual pixels are integrated in the image sensor 185, and each individual pixel may include a micro lens, a color filter, and a photodiode. Each individual pixel is a kind of photodetector that can convert incoming light into an electrical signal. The photodetector may include a photodiode.

In an embodiment, the image sensor 185 may be electrically connected to the image signal processor 187 connected to a printed circuit board 188 by a connector 186. A flexible printed circuit board (FPCB) or a cable may be used as the connector 186. The light information of the subject incident through the lens assembly 182 may be converted into an electrical signal by the image sensor 185 and input to the image signal processor 187. In an embodiment, the image signal processor 187 may be disposed independently of the processor 120 in the electronic device 100 or may be driven as a part of the processor 120.

In an embodiment, the camera module 180 may be disposed on the front surface as well as the rear surface of the electronic device 100. In addition, the electronic device 100 may include not only one camera module 180 but also several camera modules to improve camera performance. For example, the electronic device 100 may further include the front camera 161 for video call or self-camera shooting. The front camera 161 may support a relatively low number of pixels compared to the rear camera module. The front camera 161 may be relatively smaller than the rear camera module.

In an embodiment, the electronic device 100 may include the processor 120 electrically connected to the camera module 180. In an embodiment, the processor 120 may refer to at least one processor. For example, the processor 120 may include an application processor (AP), the image signal processor 187, and a communication processor (CP).

In an embodiment, the electronic device 100 may include a second memory 130 electrically connected to the processor 120. The second memory 130 may be a flash memory. The second memory 130 may store instructions that may be executed by the processor 120.

The electronic device 100 illustrated in FIG. 1 corresponds to one example, and the type of the device to which the technical idea disclosed in the disclosure is applied is not limited. For example, the technical idea disclosed in the disclosure may also be applied to a foldable electronic device that can be folded in a horizontal or vertical direction by adopting a flexible display and a hinge structure, a tablet, or a notebook computer. Although the electronic device 100 of FIG. 1 has an appearance of a bar type or a plate type, various embodiments of the disclosure are not limited thereto. For example, the illustrated electronic device 100 may be a part of a rollable electronic device. The rollable electronic device may refer to an electronic device capable of bending and deforming the display 110, so that at least a portion of the display 110 may be wound or rolled or accommodated inside the electronic device 100. The rollable electronic device may be used by expanding the screen display area by unfolding the display 110 or exposing a larger area of the display 110 to the outside according to a user's needs. The display 110 may also be referred to as a slide-out display or an expandable display.

Figure 2:
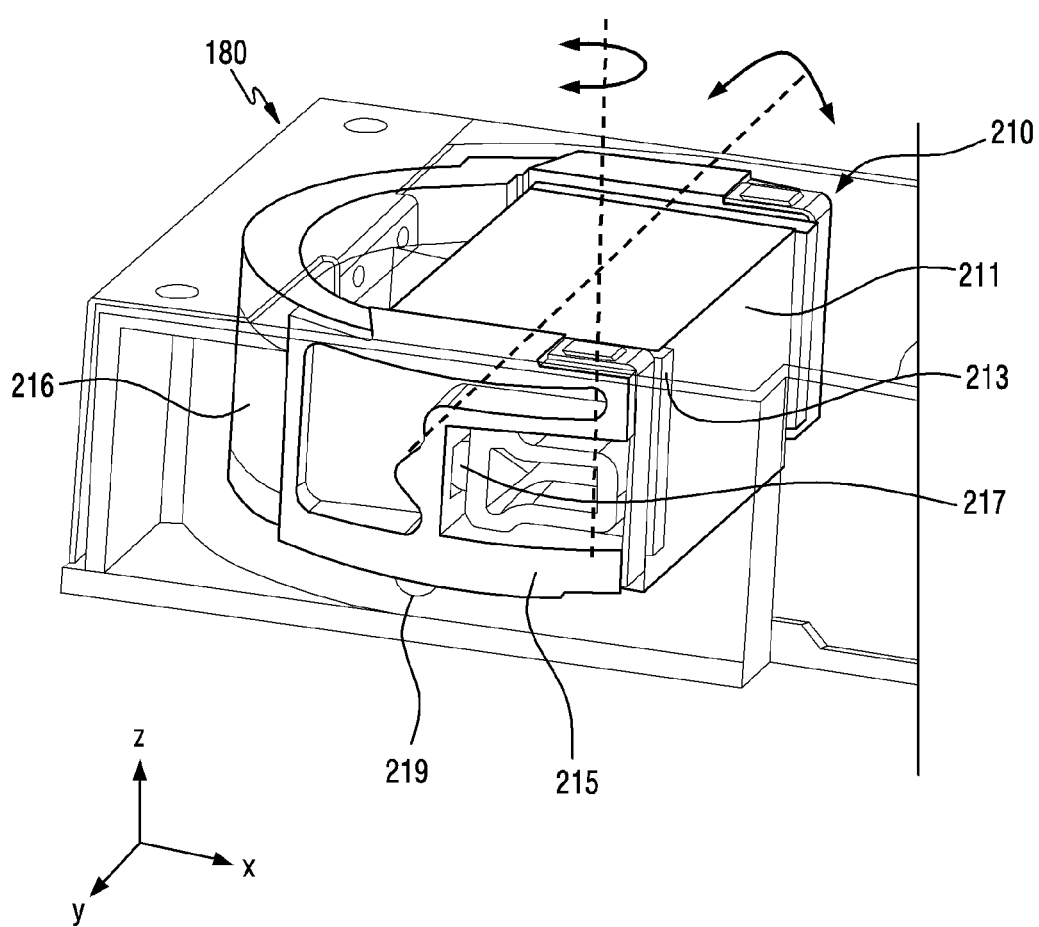
FIG. 2 illustrates a camera module according to an embodiment.
Figure 3:
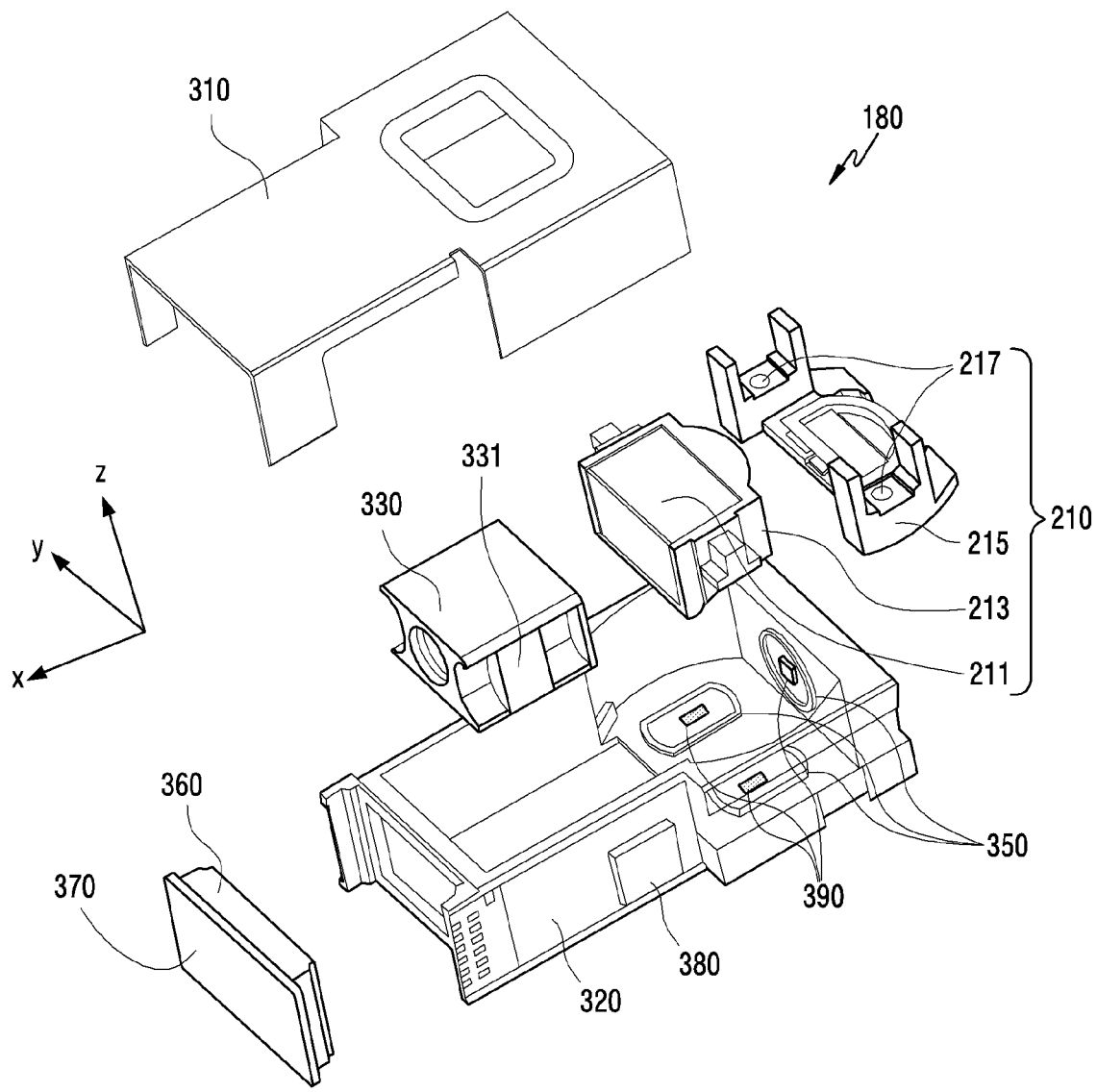
FIG. 3 is an exploded perspective view of a camera module according to an embodiment.

FIG. 2 illustrates a camera module 180 according to an embodiment. FIG. 3 is an exploded perspective view of the camera module 180 according to an embodiment.

Referring to FIGS. 2 and 3, the camera module 180 may include a cover 310, a housing assembly 320, a prism module 210, a lens assembly 330, and an image sensor 360. A lens assembly 330 of FIG. 3 may correspond to the lens assembly 182 of FIG. 1, and the image sensor 360 of FIG. 3 may correspond to the image sensor 185 of FIG. 1. In addition, a prism 211 of FIG. 2 may correspond to the reflector 181 of FIG. 1, and a printed circuit board 370 of FIG. 3 may correspond to the printed circuit board 188 of FIG. 1. Among the configurations illustrated in FIG. 2 or 3, the configuration illustrated in FIG. 1 may be omitted or briefly described.

In an embodiment, the prism module 210 may include a prism 211 (e.g., the reflector 181 in FIG. 1), a prism connector 213, a prism holder 215, a first ball set 217, and a second ball set 219. The prism connector 213 may connect the prism 211 and the prism holder 215. The prism holder 215 may have a 'U' shape, and a space between the prism holder 215 may include the prism 211 and the prism connector 213. The prism holder 215 is physically coupled to the prism 211 and may move integrally with the prism 211. The prism holder 215 may protect the prism 211 from external impact.

In an embodiment, the prism 211 may rotate along a panning axis (e.g., z-axis) and a tilting axis (e.g., y-axis). For example, the prism 211 may rotate based on a tilting axis (e.g., y-axis) based on the first ball set 217. In addition, the prism 211 may rotate based on the panning axis (e.g., z-axis) based on the second ball set 219. Rotating about the tilting axis (e.g., y-axis) may be understood as rotating in a first direction (e.g., pitch direction), and rotating about the panning axis (e.g., z-axis) may be understood as rotating in a second direction (e.g., yaw direction). The prism module 210 may be referred to as a prism assembly, and/or a prism structure.

In an embodiment, the prism 211 included in the prism module 210 is disposed in front (e.g., -x direction) of the lens assembly 330, and the prism 211 may reflect light incident on one axis (e.g., -z direction) toward the lens assembly 330. For example, the prism 211 may convert the light entering the rear surface (e.g., -z direction) of the electronic device 100 by about 90° to direct the light toward the lens assembly 330. The camera module 180 may include the prism holder 215 surrounding the prism 211 and the prism connector 213.

In an embodiment, the camera module 180 may include at least two or more magnetic substances (e.g., a first magnet 216 of FIG. 2 and/or a second magnet 331 of FIG. 3) fixed to the prism module 210 and/or the lens assembly 330. The camera module 180 may include at least two or more driving coils 350 interacting with the at least two or more magnetic substances. The at least two or more magnetic substances move integrally with the prism 211 and/or the lens assembly 330 and may transmit electromagnetic force generated by the at least two driving coils 350 to the prism 211 and/or the lens assembly 330.

In an embodiment, the camera module 180 may include at least one Hall sensor 390. The processor 120 may identify the position of the prism 211 through at least one Hall sensor 390.

In an embodiment, the camera module 180 may include the prism module 210 and a housing assembly 320 in which the lens assembly 330 may be mounted. The housing assembly 320 may be covered by the cover 310. The camera module 180 may further include a plurality of bearings capable of supporting rotation and/or linear motion of the lens assembly 330.

In an embodiment, the image sensor 360 may be disposed in connection with the printed circuit board 370 (e.g., PCB), a printed board assembly (PBA), a flexible PCB (FPCB), or a rigid-flexible PCB (RFPCB). The image sensor 360 is disposed at the rear (e.g., +x direction) of the lens assembly 330, and the light passing through the lens assembly 330 may be collected through the image sensor 360.

In an embodiment, the printed circuit board 370 may be electrically connected to an auto focus (AF) driver and an optical image stabilization (OIS) driver. When the electronic device 100 shakes, at least one processor (e.g., the processor 120 in FIG. 1) included in the electronic device 100 may generate an OIS control value to compensate for shake of the electronic device 100, and the electronic device 100 may perform shake compensation by transmitting an electrical signal corresponding to the OIS control value to at least one coil of the OIS driver. When a camera shoot, at least one processor (e.g., the processor 120 in FIG. 1) included in the electronic device 100 may generate an AF control value to adjust a focal length between the subject and the camera, and the electronic device 100 may implement AF by transmitting an electrical signal corresponding to the AF control value to at least one coil of the AF driver.

In an embodiment, the camera module 180 may include a first memory 380. In an embodiment, the first memory 380 may be a non-volatile memory. For example, the first memory 380 may be an electrically erasable and programmable read only memory (EEPROM). In an embodiment, the first memory 380 may be configured as separate hardware from the second memory 130, which is the main memory of the electronic device 100. For example, the second memory 130 may be configured as separate hardware not included in the camera module 180, and the first memory 380 may be included in the camera module 180. In an embodiment, the first memory 380 may be disposed in a part of the camera module 180. For example, the first memory 380 may be attached to a surface of the housing assembly 320. The first memory 380 may be disposed outside and/or inside the housing assembly 320. In an embodiment, the first memory 380 may be electrically and/or operatively coupled to the processor 120.

In an embodiment, the first memory 380 may be manufactured together with the camera module 180. The first memory 380 may store optical characteristics of the lens assembly 330. For example, the first memory 380 may store a first correction value for correcting shading by the lens assembly 330.

Figure 4:
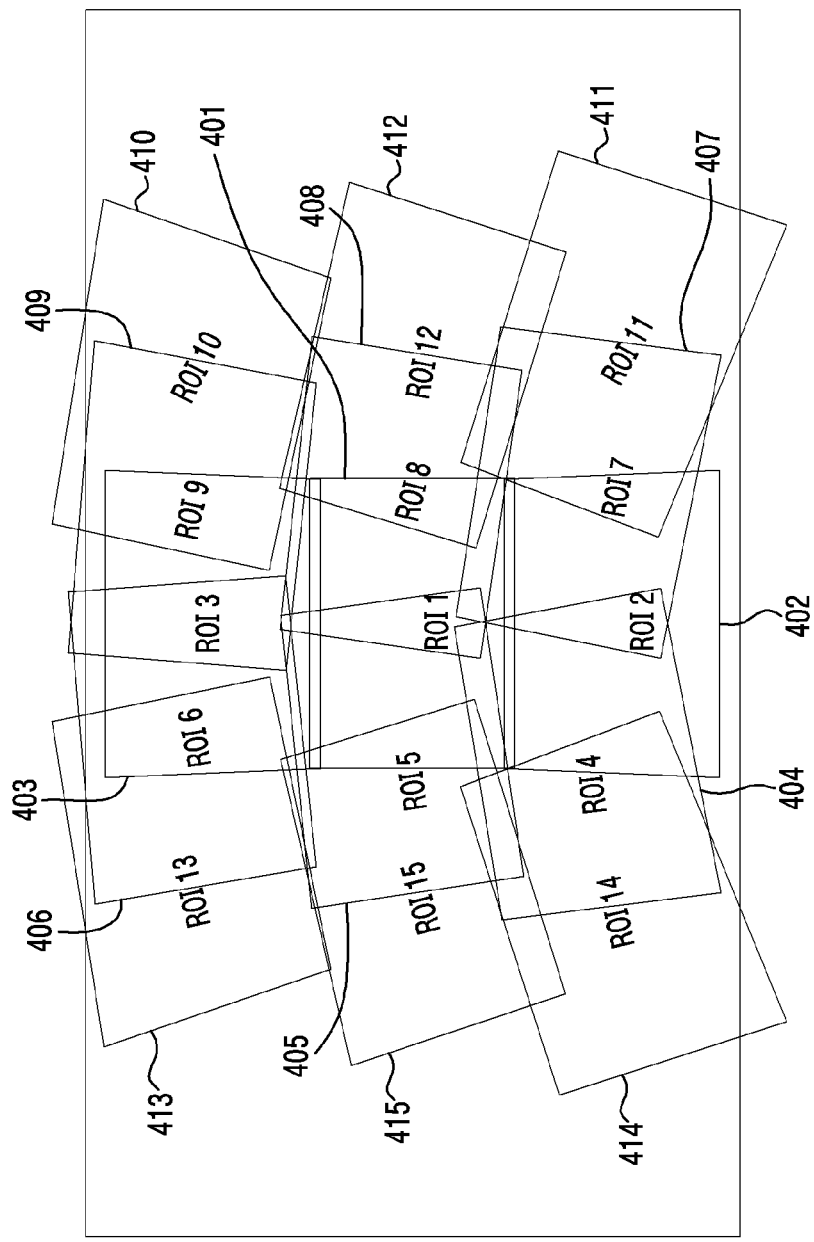
FIG. 4 illustrates an example in which a field of view is changed by an electronic device adjusting incident light through a reflector according to an embodiment.

FIG. 4 illustrates an example in which a field of view is changed by an electronic device 100 adjusting incident light through a reflector 181 according to an embodiment.

FIG. 4 illustrates an example of a field of view of images that the processor 120 may obtain by controlling the reflector 181. According to an embodiment, the electronic device 100 may change the field of view by adjusting the light incident toward the lens assembly 182 through the reflector 181. For example, the processor 120 may change the field of view by rotating the reflector 181 in a pitch direction and/or a yaw direction.

According to an embodiment, when the position of the reflector 181 is in a first position, the processor 120 may obtain an image frame corresponding to the field of view of the region of interest (ROI) 1 (401). For example, the first position of the reflector 181 may be understood as a position of the reflector 181 that injects light into the center of the lens assembly 182. For another example, the first position may refer to a position of the reflector 181 that is not rotated in the pitch direction or the yaw direction.

In an embodiment, the image frame may have the same size as the field of view or a ratio size smaller (e.g., except for some areas adjacent to the edge of the field of view) than the field of view. Hereinafter, the expression "image frame corresponding to the field of view" or "image frame having the field of view" may be understood as an image frame obtained while the camera faces the corresponding field of view.

According to an embodiment, when the position of the reflector 181 is changed from the first position to the second position, the processor 120 may obtain an image frame having a field of view of the ROI 2 (402). For example, ROI 2 (402) may refer to a field of view moved by a predetermined distance in a downward direction than ROI 1 (401). Likewise, when the position of the reflector 181 is in a third position, the processor 120 may obtain an image frame having a field of view of ROI 3 (403).

When the position of the reflector 181 is in a fourth position, the processor 120 may obtain an image frame having a field of view of ROI 4 (404). When the position of the reflector 181 is in a fifth position, the processor 120 may obtain an image frame having a field of view of ROI 5 (405). When the position of the reflector 181 is the sixth position, the processor 120 may obtain an image frame having a field of view of the ROI 6 (406). In addition, when the positions of the reflectors are in the seventh to fifteenth positions, the processor 120 may obtain image frames having a field of view of ROI 7 (407) to ROI 15 (415). The angles of view (e.g., ROI 1 (401) to ROI 15 (415)) illustrated in FIG. 4 are examples, and various embodiments that may be implemented by those skilled in the art are possible. For example, the field of view may be divided into 10 or less or 16 or more depending on the movement of the reflector 181, and when the range in which the reflector 181 can rotate in the pitch direction and/or the yaw direction is expanded, the range in which the field of view can be moved may be expanded. However, for convenience of description, embodiments of the disclosure will be described based on shading profiles of image frames having angles of view of ROI 1 (401) to ROI 15 (415).

Figure 5:
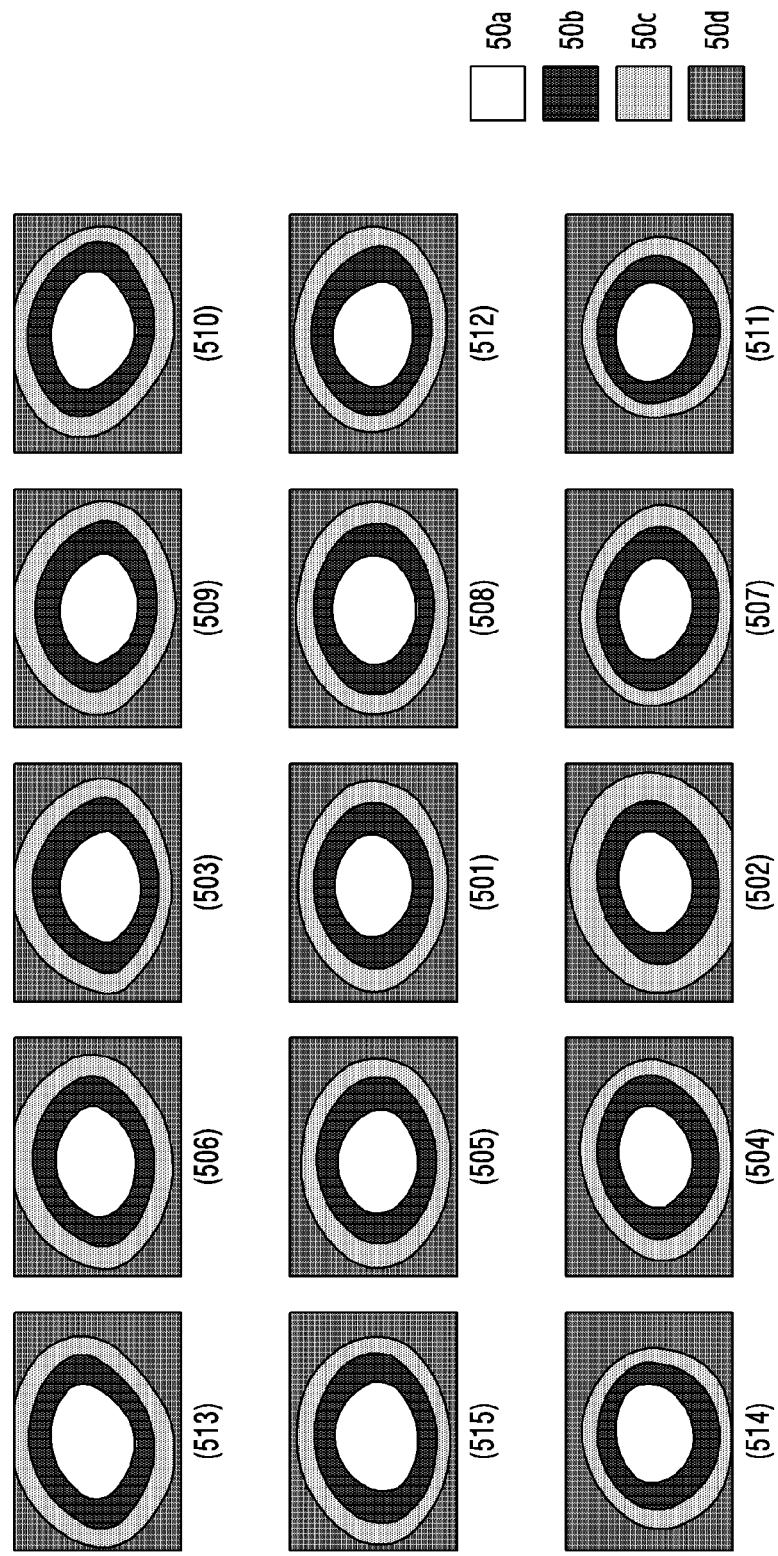
FIG. 5 illustrates an example of a shading profile obtained differently according to a position of a field of view in an electronic device according to an embodiment.

FIG. 5 illustrates an example of a shading profile obtained differently according to a position for a field of view in an electronic device 100 according to an embodiment.

FIG. 5 illustrates an example of a shading profile of an image frame obtained by the processor 120 from the camera module 180. In FIG. 5, each of the shading profiles 501 to 515 represents the ratio of the brightness of the central point of each image frame to the brightness of the corresponding point. For example, reference number 50a denotes an area in which the brightness of the corresponding point is 95% to 100% compared to the brightness of the central point, reference number 50b denotes an area in which the brightness of the corresponding point is 90% to 95% compared to the brightness of the central point, reference number 50c denotes an area in which the brightness of the corresponding point is 85% to 90% compared to the brightness of the central point, and reference number 50d denotes an area in which the brightness of the corresponding point is less than 85% compared to the brightness of the central point.

Referring to FIG. 5, the image frame obtained by the camera module 180 may have a shading profile in which the brightness decreases as the distance from the center point increases. For example, in the first shading profile 501, the area close to the center of the image frame has a brightness of 95% to 100% compared to the center point, but as the distance increases from the center point of the image frame, the brightness may decrease by less than 85% compared to the center point. The second shading profile 502 to the fifteenth shading profile 515 shows an example of the brightness decreasing as the distance increases from the center point. In an embodiment, because at least one lens included in the lens assembly 182 has a curvature, as the distance decreases from the center, an amount of light reaching the image sensor 185 may increase, and as the distance increases from the center, the amount of light reaching the image sensor 185 may decrease according to the curvature.

According to an embodiment, the shading profile may appear differently depending on the position of the field of view of the image frame. For example, in FIG. 4, the image frame having the field of view of ROI 1 (401) may have the first shading profile 501. Similarly, in FIG. 4, image frames having the field of view of ROI 2 (402) to ROI 15 (415) may have the second shading profile 502 to fifteenth shading profile 515, respectively. The field of view of FIG. 4 (e.g., ROI 1 (401) to ROI 15 (415)) and the shading profile of FIG. 5 (e.g., first shading profile 501 to fifteenth shading profile 515) may correspond to each other. According to an embodiment, the shading profile may appear differently depending on the position of the reflector 181. When the processor 120 changes the position of the reflector 181 to adjust the position of the field of view, the distribution of the amount of light incident to the lens assembly 182 may vary according to the position of the reflector 181.

According to an embodiment, the shading profile of the image frames obtained by the processor 120 may include both shading by the lens assembly 182 and shading by the reflector 181. For example, the first shading profile 501 to the fifteenth shading profile 515 may include constant shading by the lens assembly 182 regardless of the position of the reflector 181. In addition, the first shading profile 501 to the fifteenth shading profile 515 may include different shading by the reflector 181 according to the position of the reflector 181.

Figure 6:
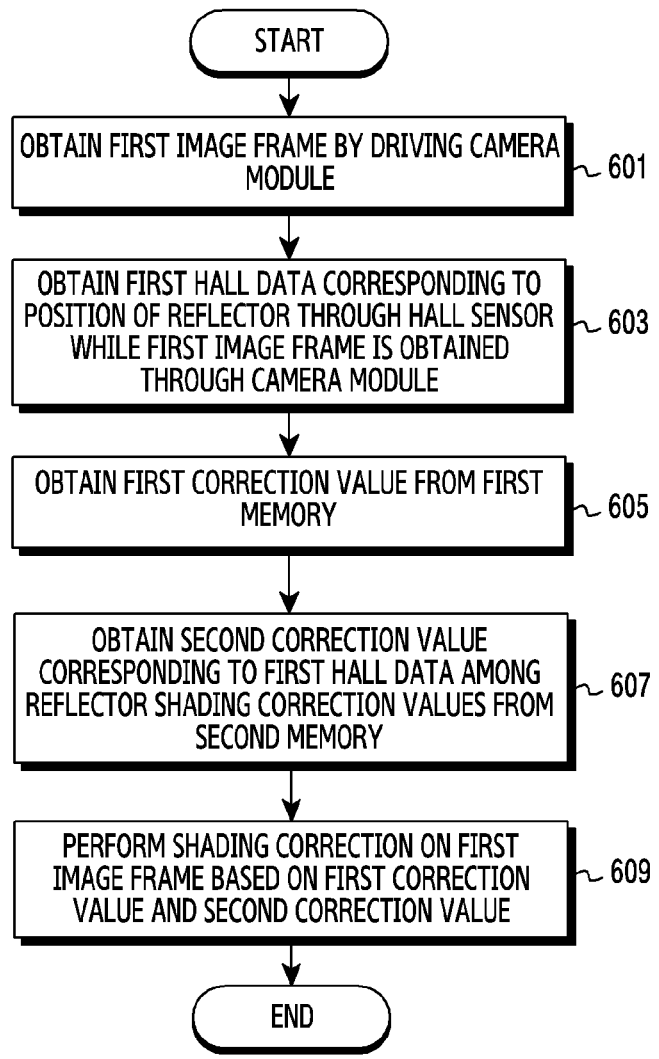
FIG. 6 is a flowchart illustrating operations in which an electronic device performs shading correction on an image frame according to an embodiment.

According to an embodiment, the electronic device 100 according to the disclosure may perform the operations illustrated in FIG. 6 to correct the shading profiles (e.g., the 1st shading profile 501 to the 15th shading profile 515) according to the position of the reflector 181 while performing a scan function by adjusting the position of the reflector 181.

FIG. 6 is a flowchart illustrating operations in which an electronic device 100 performs shading correction on an image frame according to an embodiment. The operations described in FIG. 6 may be performed by the processor 120 illustrated in FIG. 1. For example, the processor 120 may perform the operations of FIG. 6 when executing the instruction stored in the second memory 130.

According to an embodiment, in operation 601, the processor 120 may obtain the first image frame by driving the camera module 180. For example, the first image frame may be an image frame having a brightness distribution of any one of the first shading profile 501 to the fifteenth shading profile 515 illustrated in FIG. 5.

According to an embodiment, in operation 603, the processor 120 may obtain first Hall data corresponding to the position of the reflector 181 through the Hall sensor 390 while the first image frame is obtained through the camera module 180. For example, the first Hall data may correspond to an angle at which the reflector 181 is rotated in the pitch direction and/or the yaw direction with respect to the first position. The processor 120 may determine the degree to which the reflector 181 has moved (e.g., rotated) based on the first Hall data.

According to an embodiment, the first Hall data may be Hall data corresponding to the first image frame. For example, the camera module 180 may obtain image data corresponding to the first image frame by exposing the image sensor 185 while obtaining the first image frame, and the processor 120 may obtain the first Hall data corresponding to the position of the reflector 181 during the exposure time of the image sensor 185 through the Hall sensor 390. According to the above-described method, each image frame may be synchronized with each Hall data.

According to an embodiment, in operation 605, the processor 120 may obtain a first correction value from the first memory 380. The first correction value may refer to a correction value for correcting shading by the lens assembly 182. The first correction value will be described later with reference to FIG. 7.

According to an embodiment, in operation 607, the processor 120 may obtain a second correction value corresponding to the first Hall data among reflector shading correction values from the second memory 130. The reflector shading correction value is a correction value for correcting shading by the reflector 181, and may have a different value depending on the position of the reflector 181. The processor 120 may obtain a second correction value corresponding to the first Hall data from among the reflector shading correction values. The second correction value will be described later with reference to FIG. 8.

According to an embodiment, in operation 609, the processor 120 may perform shading correction on the first image frame based on the first correction value and the second correction value.

According to an embodiment, the processor 120 may correct shading by the lens assembly 182 through the first correction value, and correct shading by the reflector that is different for each position of the reflector 181 through the second correction value.

According to an embodiment, the processor 120 may display the first image frame on which the shading correction is performed as a preview on the display 110. For example, the processor 120 may output the first image frame on which the shading correction is performed as a preview to the display 110 while executing an application (e.g., a camera application) using the camera module 180.

According to an embodiment, the processor 120 may store the first image frame on which the shading correction is performed in the second memory 130. For example, the processor 120 may store the first image frame on which the shading correction is performed in the second memory 130 in response to receiving a user's photographing command.

According to an embodiment, after operation 609, the processor 120 may drive the camera module 180 to obtain a second image frame following the first image frame. The processor 120 may obtain second Hall data corresponding to the position of the reflector 181 through the Hall sensor 390 while obtaining the second image frame through the camera module 180. The processor 120 may obtain a third correction value corresponding to the second Hall data among reflector shading correction values from the second memory 130. The processor 120 may perform shading correction on the second image frame based on the first correction value and the third correction value.

According to an embodiment, although the field of view is changed while the processor 120 obtains the first image frame and the second image frame, shading by the lens assembly 182 may be constant. Accordingly, when shading correction is performed on the first image frame and the second image frame, the processor 120 may continue to use the first correction value obtained from the first memory 380. According to an embodiment, when the angles of view of the first image frame and the second image frame are different from each other, because the position of the reflector 181 is changed while the camera module 180 obtains the first image frame and the second image frame, shading by the reflector 181 may vary. Accordingly, the processor 120 may obtain a third correction value that is different from the second correction value and corresponds to the second Hall data from the second memory 130 again.

FIG. 7 illustrates an example of a first correction value 710 stored in an electronic device 100 according to an embodiment.

According to an embodiment, the first memory 380 may store the first correction value 710 for correcting shading by the lens assembly 182. The processor 120 may obtain the first correction value 710 from the first memory 380, and perform shading correction on the first image frame based on the first correction value 710.

According to an embodiment, the first correction value 710 may be calculated based on the shading profile data 700 corresponding to the brightness distribution of the image obtained when the position of the reflector 181 is the first position. For example, during the production process of the electronic device 100, the shading profile data 700 may be used to calculate the first correction value 710. The shading profile data 700 is a brightness distribution for each region of an image frame, and may include a brightness value according to a pixel position of a photographed image. In an embodiment, the first position of the reflector may refer to a position when the field of view of the image being photographed by the electronic device 100 is ROI 1 (401) of FIG. 4. When the reflector 181 is at the first position, shading by the reflector does not occur or occurs negligibly small. The first correction value 710 may be calculated based on the shading profile data 700 obtained when the position of the reflector 181 is the first position.

According to an embodiment, the shading profile data 700 may be obtained by dividing an image frame into a plurality of regions based on a ratio between brightness of the divided regions. For example, FIG. 7 illustrates shading profile data 700 obtained by dividing an image frame by 7×7. According to an embodiment, the shading value of each region included in the shading profile data 700 may be obtained based on a ratio between the brightness of the corresponding region and the brightness of the central area. For example, when the brightness of the (1, 1) region, which is the upper left region of the image frame, is 76.4% compared to the brightness of the (4, 4) region, which is the central region, the shading value of the (1, 1) region can be 76.4.

According to an embodiment, the first correction value 710 may be obtained based on the shading profile data 700. For example, the first correction value 710 may be calculated based on a value obtained by dividing the shading value of the (4, 4) region by the brightness value of each region included in the shading profile data 700. For example, in the case of the (1, 1) region, a correction value of 1.31 may be obtained by dividing 100, which is the shading value of the (4, 4) region, by 76.4, which is the shading value of the (1, 1) region.

According to an embodiment, the shading profile data 700 and the first correction value 710 illustrated in FIG. 7 are examples, and various embodiments that can be implemented by those skilled in the art are possible. For example, the first correction value may be calculated by dividing the image frame into 8×8 or more grid, and specific shading values included in the shading profile data 700 may vary according to the configuration of the lens assembly 182.

According to an embodiment, the shading profile data 700 may be obtained by photographing a light source image during a production process of the electronic device 100. The light source image may be an image obtained by photographing the light source. Because at least one lens included in the lens assembly 182 has a curvature, shading may occur by the lens assembly 182 and the shading profile data 700 may vary according to the curvature rate of the at least one lens, during the production process of the electronic device 100, a process of calculating the first correction value 710 for each electronic device 100 may be included. For example, the first correction value 710 may have a slight difference for each electronic device 100.

According to an embodiment, the first correction value 710 calculated based on the shading profile data 700 may be stored in the first memory 380. For example, the first correction value 710 may be stored in EEPROM, which is a non-volatile memory included in the camera module 180. The first correction value 710 may be stored in the first memory 380 rather than the main memory of the electronic device 100 because the data capacity is not large and the data is obtained during the production process of the camera module 180.

According to an embodiment, the processor 120 may obtain the first correction value 710 from the first memory 380 included in the camera module 180 to perform lens shading correction on the first image frame. For example, the processor 120 may multiply the first image frame by the first correction value 710. When the processor 120 performs lens shading correction through the first correction value 710 on the first image frame, shading by the lens assembly 182 included in the first image frame may be corrected.

Figure 8:
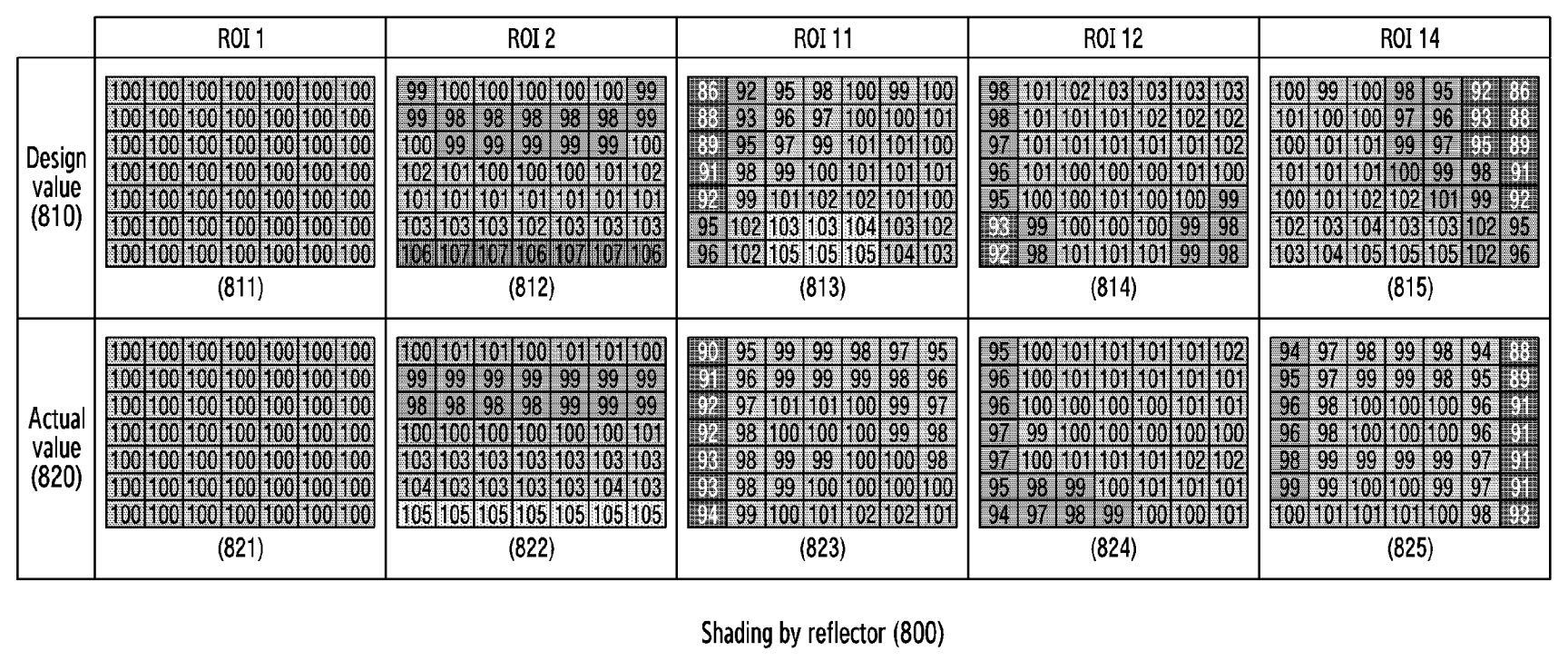

FIG. 8 illustrates an example of shading 800 by a reflector 181 in an electronic device 100 according to an embodiment.

According to an embodiment, the second memory 130 may store a reflector shading correction value for correcting shading by the reflector 181. The processor 120 may obtain a second correction value corresponding to the first Hall data among reflector shading correction values from the second memory 130, and perform shading correction on the first image frame based on the second correction value.

Referring to FIG. 8, shading 800 by the reflector may appear differently for each position of the reflector 181. Shading 800 by the reflector of FIG. 8 may refer to shading profile data after shading by the lens assembly 182 included in image frames having different angles of view is corrected. For example, when the processor 120 corrects shading by the lens assembly 182 through the first correction value 710 of FIG. 7 for image frames having angles of view of ROI 1 (401), ROI 2 (402), ROI 11 (411), ROI 12 (412), and ROI 14 (414), the image frames whose shading by the lens assembly 182 is corrected may have shading profile data corresponding to the shading 800 by the reflector of FIG. 8.

According to an embodiment, the electronic device 100 may store the reflector shading correction value calculated using the design value 810 instead of the actual value 820 of the shading 800 by the reflector in the second memory 130. For example, even when the electronic device 100 stores the reflector shading correction value calculated based on the actual value 820 of the shading 800 by the reflector, the processor 120 may correct shading by the reflector 181 of the image frame based on the reflector shading correction value.

However, in order to store the reflector shading correction value obtained using the actual value 820, a process of obtaining shading profile data (e.g., actual value 820 in FIG. 8) according to the position of the reflector 181 during the production process of the electronic device 100 and a process of calculating the reflector shading correction value is added. In addition, because the data capacity of the reflector shading correction value calculated for each position of the reflector 181 is large, which may occupy a large amount of storage space of the first memory 380.

According to an embodiment, if there is no significant difference between the shading correction based on the design value 810 and the shading correction based on the actual value 820, performing the reflector shading correction using the design value 810 may be advantageous in terms of processing and/or storage space. For example, in FIG. 8, it can be confirmed that there is no significant difference between the shading 800 by the reflector according to the design value 810 and the shading 800 by the reflector according to the actual value 820. For example, comparing the design value 812 and the actual value 822 of the ROI 2 (402), a common feature is that the lower part of the image is brighter than the upper part, and the difference in the shading values of each region included in the shading profile data is not large either. As another example, comparing the design value 813 and the actual value 823 of the ROI 11 (411), a common feature is that the upper left corner of the image is darker than the central area. Accordingly, there may be no significant difference in the quality of the shading correction for the first image frame between the case when the processor 120 performs shading correction on the first image frame based on the reflector shading correction value corresponding to the actual value 820, and the case when the processor 120 performs shading correction on the first image frame based on the reflector shading correction value corresponding to the design value 810. In the electronic device 100 according to an embodiment of the disclosure, the reflector shading correction value calculated based on the design value 810 may be stored in the second memory 130 instead of using the actual value 820. The processor 120 may obtain a second correction value corresponding to the first Hall data among the reflector shading correction values calculated based on the design value 810 from the second memory 130, and may perform shading correction on the first image frame based on the second correction value.

According to an embodiment, the reflector shading correction value stored in the second memory 130 may be a design value defined by the manufacturer of the electronic device 100. The reflector shading correction value may be understood as a value specified or designed by the manufacturer of the electronic device 100. For example, the reflector shading correction value may be a value calculated based on the design value 810 of FIG. 8. According to an embodiment, the reflector shading correction value may be stored in the form of at least one of a shading correction function corresponding to the position of the reflector 181 or a lookup table.

According to an embodiment, the electronic device 100 may reduce the amount of data stored in the first memory 380 by storing the shading correction value in the second memory 130 that is the flash memory of the electronic device 100 together with the first memory 380 that is the nonvolatile memory of the camera module 180. In addition, because the steps required for the production process of the electronic device 100 may be reduced, the production cost may be reduced.

Figure 9:
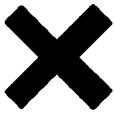
FIG. 9 illustrates an example of performing shading correction on an image frame based on a first correction value and a second correction value in an electronic device according to an embodiment.
Figure 9:
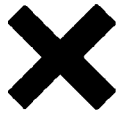

FIG. 9 illustrates an example of performing shading correction on an image frame based on a first correction value 710 and a second correction value 920 in an electronic device 100 according to an embodiment.

According to an embodiment, the processor 120 may perform shading correction on the first image frame based on the first correction value 710 and the second correction value 920 in operation 609 of FIG. 6. FIG. 9 illustrates an example of shading correction performed based on the first correction value 710 and the second correction value 920 on the shading profile data 910 of the first image frame.

According to an embodiment, the shading profile data 910 represents a brightness distribution of the first image frame. For example, the first image frame may be an image frame obtained from the ROI 2 (402), and the shading profile data 910 of the first image frame may include both shading by the lens assembly 182 and shading by the reflector 181.

According to an embodiment, the processor 120 may correct shading by the lens assembly 182 with respect to the first image frame based on the first correction value 710. For example, the processor 120 may multiply the first image frame by the first correction value 710. FIG. 9 illustrates an example of shading profile data 915 in which shading by the lens assembly 182 is corrected when the shading profile data 910 of the first image frame is multiplied by the first correction value 710.

According to an embodiment, the processor 120 may correct shading by the reflector 181 with respect to the first image frame based on the second correction value 920. For example, the processor 120 may multiply the first image frame by the second correction value 920. FIG. 9 illustrates an example of shading profile data 925 in which shading correction is performed by multiplying the shading profile data 915 corrected for shading by the lens assembly 182 by a second correction value 920.

According to an embodiment, the shading profile data 925 on which the shading correction has been performed represents the brightness distribution of the first image frame in which shading by the lens assembly 182 and shading by the reflector 181 are corrected. For example, when shading correction is performed on the first image frame, the brightness of each region obtained by dividing the image frame into a plurality of regions may not be significantly different from the brightness of the central region (e.g., the brightness of the (4, 4) area). Referring to FIG. 9, in the shading profile data 925 on which shading correction has been performed, the shading value of each region may be 98 to 103.

According to an embodiment, in FIG. 9, although it is illustrated that the first image frame is multiplied by the first correction value 710 and multiplied by the second correction value 920, this is an example, and various embodiments that can be implemented by those skilled in the art are possible. For example, the processor 120 may multiply the first image frame by the second correction value 920 and multiply by the first correction value 710, and the processor 120 may multiply the first image frame by the shading correction value obtained by multiplying the first correction value 710 and the second correction value 920.

Figure 10:
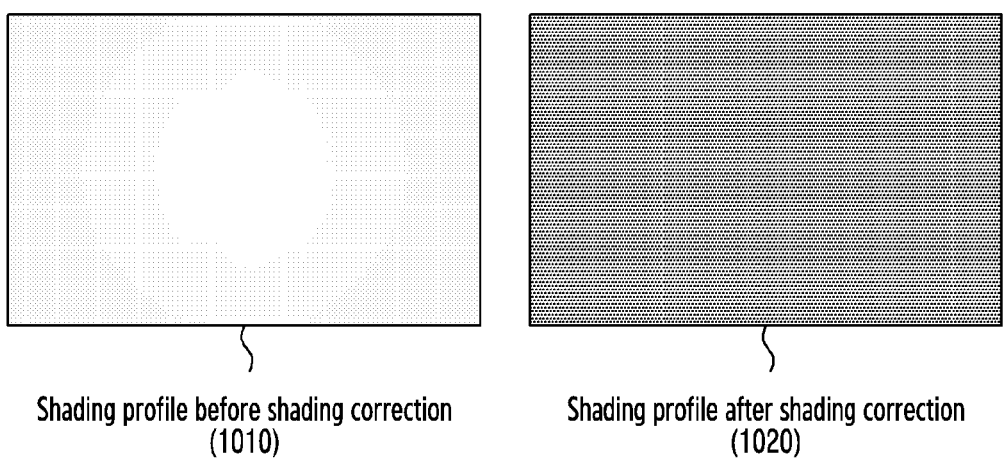
FIG. 10 illustrates an example of a shading profile before and after performing shading correction in an electronic device according to an embodiment.

FIG. 10 illustrates an example of a shading profile before and after performing shading correction in an electronic device 100 according to an embodiment.

Referring to FIG. 10, the shading profile 1010 before shading correction may indicate a brightness distribution of an image frame in which shading by the lens assembly 182 and shading by the reflector 181 are not corrected. The shading profile 1020 after shading correction may indicate a brightness distribution of an image frame in which shading by the lens assembly 182 and shading by the reflector 181 are corrected.

According to an embodiment, the brightness distribution of the first image frame obtained by the processor 120 in operation 601 of FIG. 6 may correspond to the shading profile 1010 before shading correction. For example, in the shading profile 1010 before shading correction, the brightness may decrease as the distance from the center point of the first image frame increases.

According to an embodiment, the brightness distribution of the first image frame on which the processor 120 performs shading correction in operation 609 of FIG. 6 may correspond to the shading profile 1020 after shading correction. For example, in the shading profile 1020 after shading correction, the brightness may be constant even if the distance from the center point of the first image frame increases. The case in which the brightness is constant may include a case in which the brightness is the same or the difference in brightness is negligible.

According to an embodiment, the electronic device 100 may apply a shading correction value (e.g., the second correction value) appropriate to the position of the reflector 181 (e.g., the prism 211 in FIG. 2). In addition, according to an embodiment of the disclosure, when the electronic device 100 rotates the reflector 181 to obtain images of various angles of view, the brightness of the image may be uniform in the entire area.

Figure 11:
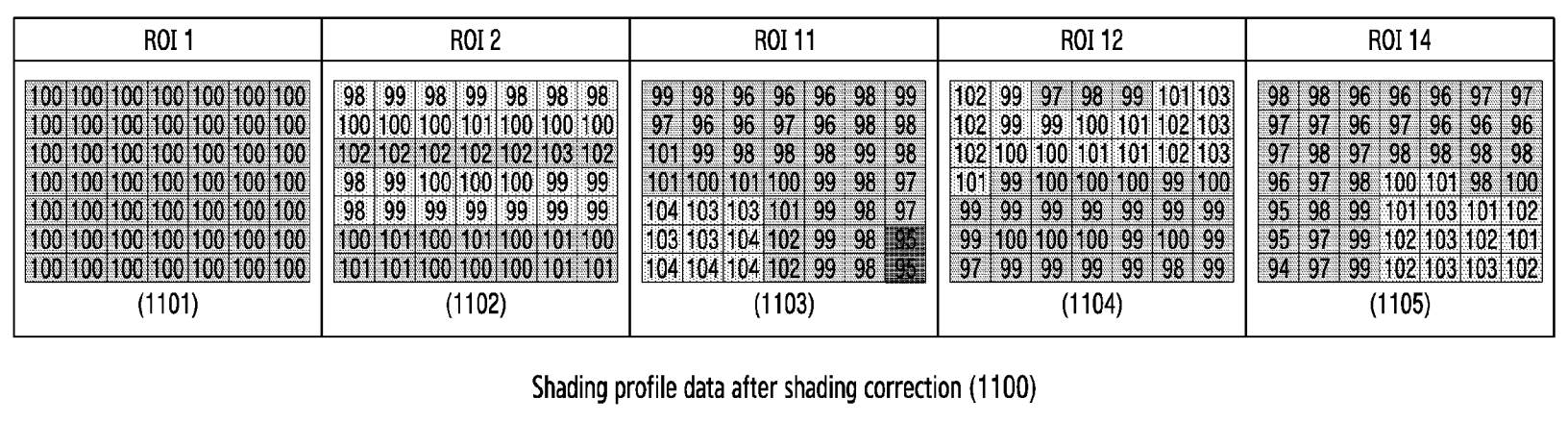

FIG. 11 illustrates an example of shading profile data 1100 after shading correction is performed according to an embodiment.

According to an embodiment, when the processor 120 performs shading correction based on the first correction value 710 and the second correction value 920 on image frames having different angles of view according to the position of the reflector 181, the shading profile data 1100 after shading correction may have a constant brightness distribution.

Referring to FIG. 11, after shading correction of an image having a field of view of ROI 1 (401), brightness of the shading profile data 1101 is constant in all regions, so that the shading value of each region may be expressed as 100. After shading correction of an image having a field of view of ROI 2 (402) to ROI 14 (414), the shading profile data 1102, 1103, 1104, and 1105 have the same or similar brightness in all regions, so that the shading value of each region is 95 to 104. That is, the electronic device 100 may obtain an image frame having a constant brightness in all regions of the image through shading correction according to embodiments of the disclosure. In this case, the constant brightness may include a case in which the brightness is the same in all image areas or there is no significant difference to be regarded as the same. For example, when the electronic device 100 photographs a subject (e.g., a light source) having a specific brightness, the processor 120 may obtain an image having the same or similar brightness within a predetermined range in all areas of the image.

Figure 12:
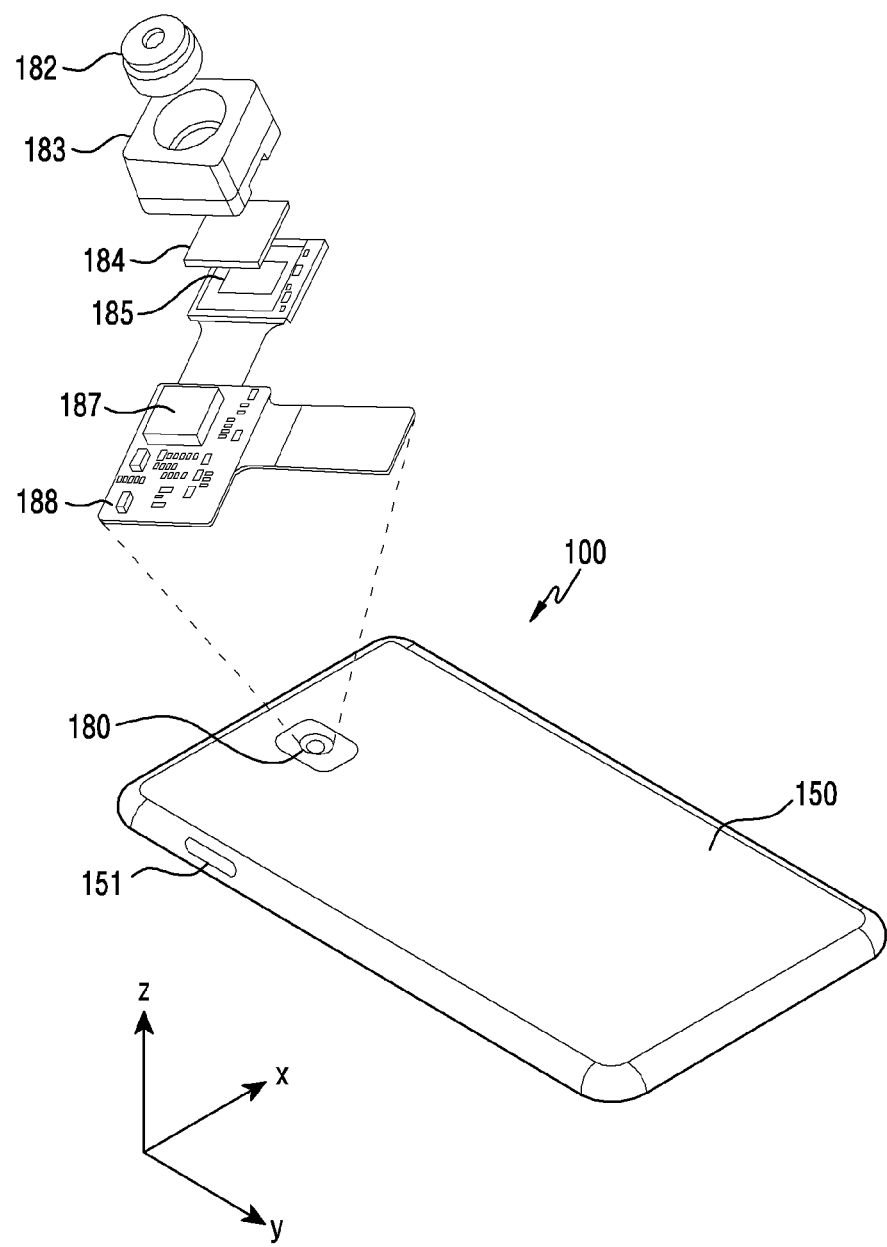
FIG. 12 illustrates an electronic device according to an embodiment.

FIG. 12 illustrates an electronic device 100 according to an embodiment.

Referring to FIG. 12, the electronic device 100 may include a rear cover 150, a first function key 151, and a camera module 180. The electronic device 100 of FIG. 12 may correspond to the electronic device 100 of FIG. 1, and the camera module 180 of FIG. 12 may correspond to the camera module 180 of FIG. 1. Among the configurations illustrated in FIG. 12, the configuration described in FIG. 1 may be omitted or briefly described. For example, the description of the configuration illustrated in FIG. 1 may also be applied to FIG. 12 except for the description of the arrangement.

Referring to FIG. 12, the camera module 180 may include a lens assembly 182, an AF/OIS carrier assembly 183, an infrared cut filter 184, and an image sensor 185. The electronic device 100 may include an image signal processor 187 electrically connected to the camera module 180. The image signal processor 187 may be referred to as included in the processor 120.

In an embodiment, the lens assembly 182, the AF/OIS carrier assembly 183, and the image sensor 185 may be disposed parallel to the direction of light incident to the electronic device 100, unlike that illustrated in FIG. 1. For example, the lens assembly 182, the AF/OIS carrier assembly 183, and the image sensor 185 may be disposed substantially parallel to a direction (e.g., −z direction) of light incident on the electronic device 100. In an embodiment, the camera module 180 may not include the reflector 181 (e.g., the prism 211 of FIG. 2) unlike that illustrated in FIG. 1.

According to an embodiment, the electronic device 100 may support optical image stabilization (OIS) or optical zoom by moving the lens assembly 182. For example, the camera module 180 may include an actuator capable of performing OIS or optical zoom by moving the lens assembly 182. The camera module 180 may control the actuator to move the lens assembly 182 perpendicular to the optical axis (e.g., z-axis) to perform OIS, and may control the actuator to move the lens assembly 182 parallel to the optical axis (e.g., z-axis) to perform optical zoom.

According to an embodiment, the camera module 180 may further include at least one Hall sensor for identifying the position of the lens assembly. The Hall sensor for identifying the position of the lens assembly may be distinguished from the Hall sensor 390 illustrated in FIG. 3. In addition, in an embodiment, the camera module 180 may further include a first memory 380 that stores a first correction value for correcting shading by the lens assembly 182. For example, the first memory 380 may be an EEPROM. The first memory 380 may correspond to the first memory 380 illustrated in FIG. 3.

According to an embodiment, the electronic device 100 may include a second memory 130 electrically connected to the processor 120. For example, the second memory 130 may be a flash memory. According to an embodiment, the second memory 130 may store a shading movement correction value for correcting shading that is changed as the lens assembly 182 is moved. For example, the shading movement correction value may be a value for correcting a change in shading by the lens assembly 182 as the lens assembly 182 moves perpendicularly or parallel to the optical axis.

Figure 13:
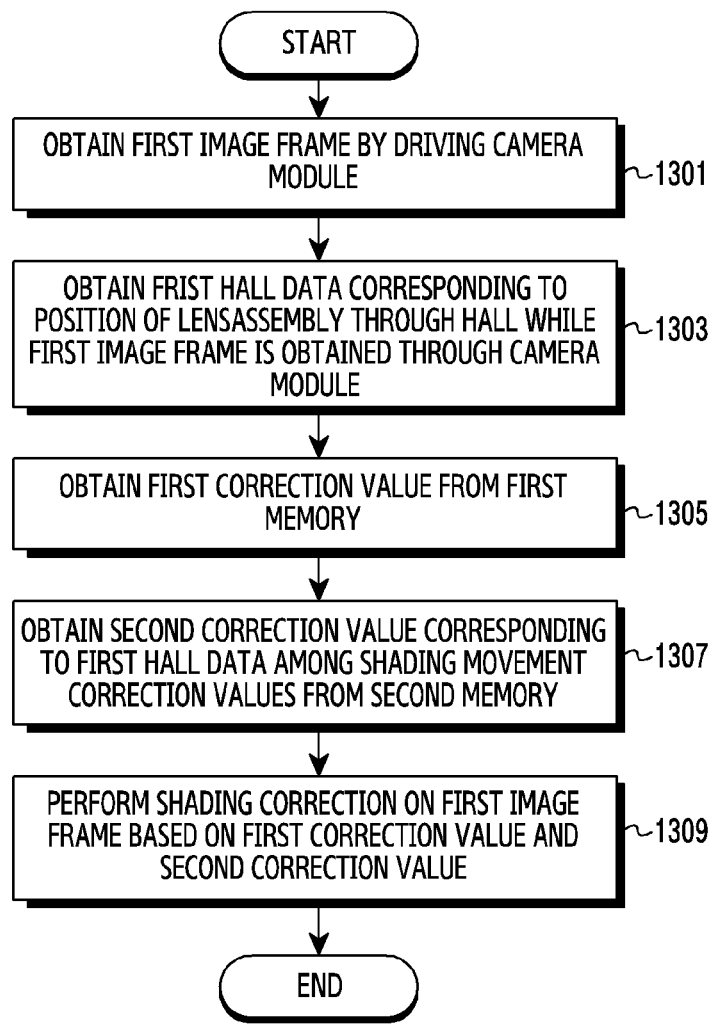
FIG. 13 is a flowchart illustrating operations in which an electronic device performs shading correction on an image frame according to an embodiment.

FIG. 13 is a flowchart illustrating operations in which an electronic device 100 performs shading correction on an image frame according to an embodiment. The operations described in FIG. 13 may be performed by the processor 120 illustrated in FIG. 1. For example, the processor 120 may perform the operations of FIG. 13 when executing an instruction stored in the second memory 130.

According to an embodiment, in operation 1301, the processor 120 may obtain the first image frame by driving the camera module 180. Operation 1301 may correspond to operation 601 of FIG. 6.

According to an embodiment, in operation 1303, the processor 120 may obtain first Hall data corresponding to the position of the reflector 181 through the Hall sensor while the first image frame is obtained through the camera module 180. For example, the first Hall data may correspond to a distance by which the lens assembly 182 is moved in a direction perpendicular and/or parallel to the optical axis from the reference position. The reference position may refer to a position of the lens assembly 182 in which light is incident to the center of the lens assembly 182 and optical zoom is not performed. The processor 120 may determine the position of the lens assembly 182 based on the first Hall data.

According to an embodiment, the first Hall data may be Hall data synchronized with the first image frame. For example, the camera module 180 may obtain image data included in the first image frame by exposing the image sensor 185 while obtaining the first image frame, and the processor 120 may obtain the first Hall data corresponding to the position of the lens assembly 182 during the exposure time of the image sensor 185 through the Hall sensor 390.

According to an embodiment, in operation 1305, the processor 120 may obtain a first correction value from the first memory 380. Operation 1305 may correspond to operation 605 of FIG. 6. The first correction value may correspond to the first correction value 710 described with reference to FIG. 7.

According to an embodiment, in operation 1307, the processor 120 may obtain a second correction value corresponding to the first Hall data among shading movement correction values from the second memory 130. The shading movement correction value may have a different value depending on the position of the lens assembly 182. The processor 120 may obtain a second correction value corresponding to the first Hall data from among the shading movement correction values. The second correction value may be distinguished from the second correction value 920 described with reference to FIGS. 8 to 9.

According to an embodiment, in operation 1309, the processor 120 may perform shading correction on the first image frame based on the first correction value and the second correction value.

Figure 14:
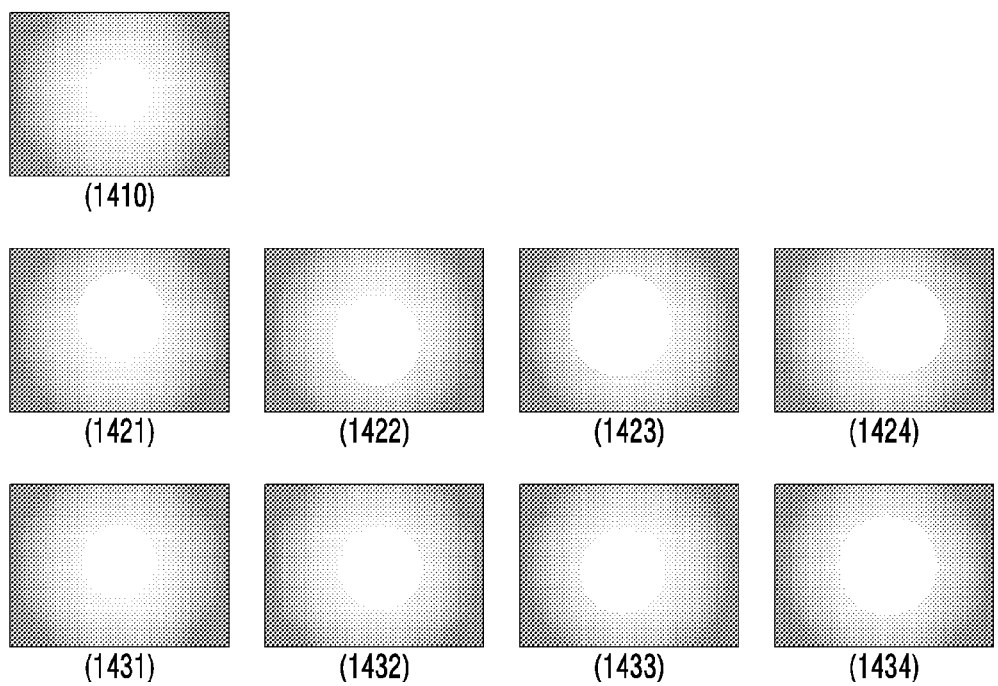
FIG. 14 illustrates an example of a shading profile and shading correction according to optical image stabilization (OIS) in an electronic device according to an embodiment.

FIG. 14 illustrates an example of a shading profile and shading correction according to OIS in an electronic device 100 according to an embodiment.

Referring to FIG. 14, the shading profile 1410 represents a brightness distribution of an image frame obtained when the position of the lens assembly 182 is the reference position. The reference position may be a position at which light is incident to the center of the lens assembly 182. Shading profile 1421, shading profile 1422, shading profile 1423, and shading profile 1424 represent altered brightness distributions as the actuator moves the lens assembly 182 to perform OIS. The shading profile 1431 is a combination of the shading profile 1410 and the shading profile 1421, and represents a brightness distribution of an image frame obtained by the processor 120 performing OIS. Similarly, the shading profile 1432 may be understood as a combination of the shading profile 1410 and the shading profile 1422, the shading profile 1433 may be understood as a combination of the shading profile 1410 and the shading profile 1423, and the shading profile 1434 may be understood as a combination of the shading profile 1410 and the shading profile 1424.

According to an embodiment, the processor 120 may correct shading by the lens assembly 182 corresponding to the shading profile 1410 through the first correction value. In addition, the processor 120 may correct shading that is changed as the lens assembly 182 corresponding to the shading profile 1421 to the shading profile 1424 is moved through the second correction value. That is, the processor 120 may correct shading by the lens assembly 182 and shading changed according to the movement of the lens assembly 182 based on the first correction value and the second correction value.

In FIG. 14, an example of the case in which the processor 120 controls the actuator to perform OIS is described, but the embodiment of the disclosure may be applied even when optical zoom is performed by moving the lens assembly 182 parallel to the optical axis through the actuator.

An electronic device according to an embodiment may include a camera module including a lens assembly, a reflector configured to change a field of view by adjusting light incident toward the lens assembly, at least one Hall sensor configured to identify a position of the reflector, and a first memory configured to store a first correction value for correcting shading by the lens assembly, a second memory configured to store a reflector shading correction value and instructions for correcting shading by the reflector, wherein the reflector shading correction value has a different value depending on the position of the reflector, and at least one processor electrically connected to the camera module and the second memory. The at least one processor may, when executing the instructions, be configured to obtain a first image frame by driving the camera module, obtain first Hall data corresponding to the position of the reflector through the at least one Hall sensor while the first image frame is obtained through the camera module, obtain the first correction value from the first memory, obtain a second correction value corresponding to the first Hall data among the reflector shading correction values from the second memory, and perform shading correction on the first image frame based on the first correction value and the second correction value.

In the electronic device according to an embodiment, the at least one processor, when executing the instructions, may be further configured to calculate the first correction value based on shading profile data corresponding to a brightness distribution of an image obtained when the position of the reflector is the first position.

In the electronic device according to an embodiment, the second memory may be further configured to store each of the reflector shading correction values in a form of at least one of a shading correction function corresponding to the position of the reflector or a lookup table.

In the electronic device according to an embodiment, each of the reflector shading correction values may be a design value defined by a manufacturer of the electronic device.

In the electronic device according to an embodiment, the at least one processor may, when executing the instructions, obtain a second image frame following the first image frame by driving the camera module, obtain second Hall data corresponding to the position of the reflector through the at least one Hall sensor while the second image frame is obtained through the camera module, obtain a third correction value corresponding to the second Hall data among the reflector shading correction values from the second memory, and perform shading correction on the second image frame based on the first correction value and the third correction value.

In the electronic device according to an embodiment, the reflector may include at least one of a prism and a mirror.

The electronic device according to an embodiment may include a display electrically connected to the at least one processor, wherein the at least one processor, when executing the instructions, may be further configured to display the first image frame on which the shading correction is performed as a preview on the display.

In the electronic device according to an embodiment, the at least one processor, when executing the instructions, may be further configured to store the first image frame on which the shading correction is performed in the second memory.

In the electronic device according to an embodiment, the first memory may be an electrically erasable programmable read-only memory (EEPROM).

In the electronic device according to an embodiment, the second memory may be a flash memory.

A method of operating an electronic device according to an embodiment may include obtaining a first image frame by driving a camera module included in the electronic device, obtaining first Hall data corresponding to the position of the reflector through at least one Hall sensor capable of identifying the position of the reflector included in the camera module while the first image frame is obtained through the camera module, obtaining a first correction value for correcting shading by the lens assembly from the first memory included in the camera module, obtaining a second correction value corresponding to the first Hall data among reflector shading correction values for correcting shading by the reflector from a second memory included in the electronic device, and performing shading correction on the first image frame based on the first correction value and the second correction value.

In the method of operating an electronic device according to an embodiment, the first correction value may be calculated based on shading profile data corresponding to a brightness distribution of an image obtained when the position of the reflector is the first position.

In the method of operating an electronic device according to an embodiment, each of the reflector shading correction values may be stored in the form of at least one of a shading correction function corresponding to the position of the reflector or a lookup table.

A method of operating an electronic device according to an embodiment may include obtaining a second image frame following the first image frame by driving the camera module, obtaining second Hall data corresponding to the position of the reflector through the at least one Hall sensor while the second image frame is obtained through the camera module, obtaining a third correction value corresponding to the second Hall data among the reflector shading correction values from the second memory, and performing shading correction on the second image frame based on the first correction value and the third correction value.

A method of operating an electronic device according to an embodiment may include storing the first image frame on which the shading correction is performed in the second memory.

An electronic device according to an embodiment may include a camera module including a lens assembly, an actuator configured to perform optical image stabilization (OIS) and optical zoom by moving the lens assembly, at least one Hall sensor configured to identify a position of the lens assembly, and a first memory configured to store a first correction value for correcting shading by the lens assembly, a second memory configured to store shading movement correction values and instructions for correcting shading that changes as the lens assembly is moved, wherein each of the shading movement correction values has a different value depending on the position of the lens assembly, and at least one processor electrically connected to the camera module and the second memory. The at least one processor may, when executing the instructions, obtain a first image frame by driving the camera module, obtain first Hall data corresponding to the position of the lens assembly through the at least one Hall sensor while the first image frame is obtained through the camera module, obtain the first correction value from the first memory, obtain a second correction value corresponding to the first Hall data among the shading movement correction values from the second memory, and perform shading correction on the first image frame based on the first correction value and the second correction value.

In the electronic device according to an embodiment, the at least one processor, when executing instructions, may be further configured to calculate the first correction value based on shading profile data corresponding to a brightness distribution of an image obtained when the position of the lens assembly is the first position.

In the electronic device according to an embodiment, the first memory may be an EEPROM.

In the electronic device according to an embodiment, the second memory may be a flash memory.

In the electronic device according to an embodiment, the at least one processor may, when executing the instructions, obtain a second image frame following the first image frame by driving the camera module, obtain second Hall data corresponding to the position of the lens assembly through the at least one Hall sensor while the second image frame is obtained through the camera module, obtain a third correction value corresponding to the second Hall data among the shading movement correction values from the second memory, and perform shading correction on the second image frame based on the first correction value and the third correction value.

Figure 15:
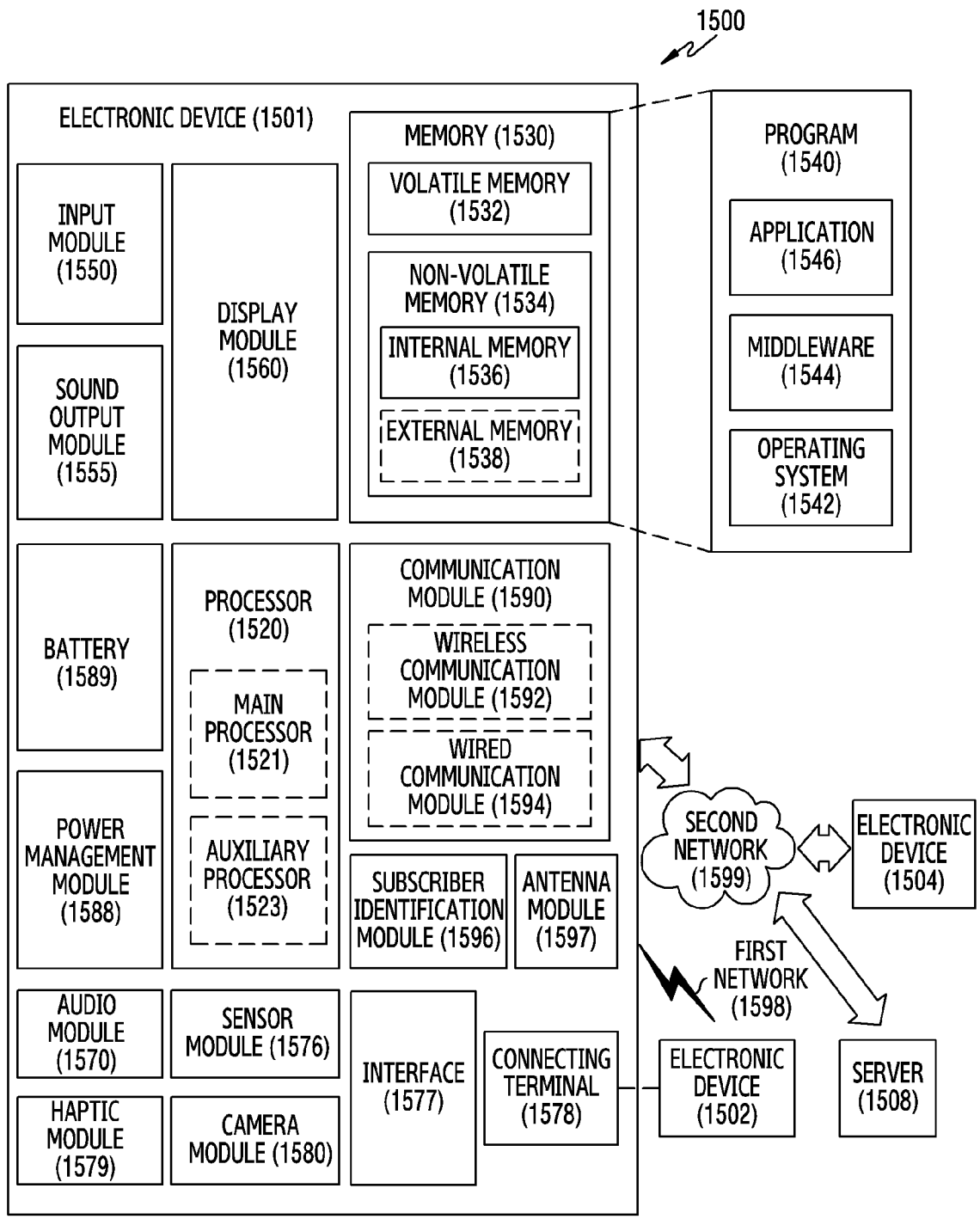
FIG. 15 is a block diagram of an electronic device in a network environment according to various embodiments.

FIG. 15 is a block diagram illustrating an electronic device 1501 in a network environment 1500 according to various embodiments. Referring to FIG. 15, the electronic device 1501 in the network environment 1500 may communicate with an electronic device 1502 via a first network 1598 (e.g., a short-range wireless communication network), or at least one of an electronic device 1504 or a server 1508 via a second network 1599 (e.g., a long-range wireless communication network). According to an embodiment, the electronic device 1501 may communicate with the electronic device 1504 via the server 1508. According to an embodiment, the electronic device 1501 may include a processor 1520, memory 1530, an input module 1550, a sound output module 1555, a display module 1560, an audio module 1570, a sensor module 1576, an interface 1577, a connecting terminal 1578, a haptic module 1579, a camera module 1580, a power management module 1588, a battery 1589, a communication module 1590, a subscriber identification module (SIM) 1596, or an antenna module 1597. In some embodiments, at least one of the components (e.g., the connecting terminal 1578) may be omitted from the electronic device 1501, or one or more other components may be added in the electronic device 1501. In some embodiments, some of the components (e.g., the sensor module 1576, the camera module 1580, or the antenna module 1597) may be implemented as a single component (e.g., the display module 1560).

The processor 1520 may execute, for example, software (e.g., a program 1540) to control at least one other component (e.g., a hardware or software component) of the electronic device 1501 coupled with the processor 1520, and may perform various data processing or computation. According to one embodiment, as at least part of the data processing or computation, the processor 1520 may store a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 may include a main processor 1521 (e.g., a central processing unit (CPU) or an application processor (AP)), or an auxiliary processor 1523 (e.g., a graphics processing unit (GPU), a neural processing unit (NPU), an image signal processor (ISP), a sensor hub processor, or a communication processor (CP)) that is operable independently from, or in conjunction with, the main processor 1521. For example, when the electronic device 1501 includes the main processor 1521 and the auxiliary processor 1523, the auxiliary processor 1523 may be adapted to consume less power than the main processor 1521, or to be specific to a specified function. The auxiliary processor 1523 may be implemented as separate from, or as part of the main processor 1521.

The auxiliary processor 1523 may control at least some of functions or states related to at least one component (e.g., the display module 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active state (e.g., executing an application). According to an embodiment, the auxiliary processor 1523 (e.g., an image signal processor or a communication processor) may be implemented as part of another component (e.g., the camera module 1580 or the communication module 1590) functionally related to the auxiliary processor 1523. According to an embodiment, the auxiliary processor 1523 (e.g., the neural processing unit) may include a hardware structure specified for artificial intelligence model processing. An artificial intelligence model may be generated by machine learning. Such learning may be performed, e.g., by the electronic device 1501 where the artificial intelligence is performed or via a separate server (e.g., the server 1508). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1530 may store various data used by at least one component (e.g., the processor 1520 or the sensor module 1576) of the electronic device 1501. The various data may include, for example, software (e.g., the program 1540) and input data or output data for a command related thereto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input module 1550 may receive a command or data to be used by another component (e.g., the processor 1520) of the electronic device 1501, from the outside (e.g., a user) of the electronic device 1501. The input module 1550 may include, for example, a microphone, a mouse, a keyboard, a key (e.g., a button), or a digital pen (e.g., a stylus pen).

The sound output module 1555 may output sound signals to the outside of the electronic device 1501. The sound output module 1555 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1560 may visually provide information to the outside (e.g., a user) of the electronic device 1501. The display module 1560 may include, for example, a display, a hologram device, or a projector and control circuitry to control a corresponding one of the display, hologram device, and projector. According to an embodiment, the display module 1560 may include a touch sensor adapted to detect a touch, or a pressure sensor adapted to measure the intensity of force incurred by the touch.

The audio module 1570 may convert a sound into an electrical signal and vice versa. According to an embodiment, the audio module 1570 may obtain the sound via the input module 1550, or output the sound via the sound output module 1555 or a headphone of an external electronic device (e.g., an electronic device 1502) directly (e.g., wiredly) or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the electronic device 1502) directly (e.g., wiredly) or wirelessly. According to an embodiment, the interface 1577 may include, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device (e.g., the electronic device 1502). According to an embodiment, the connecting terminal 1578 may include, for example, a HDMI connector, a USB connector, a SD card connector, or an audio connector (e.g., a headphone connector).

The haptic module 1579 may convert an electrical signal into a mechanical stimulus (e.g., a vibration or a movement) or electrical stimulus which may be recognized by a user via his tactile sensation or kinesthetic sensation. According to an embodiment, the haptic module 1579 may include, for example, a motor, a piezoelectric element, or an electric stimulator.

The camera module 1580 may capture a still image or moving images. According to an embodiment, the camera module 1580 may include one or more lenses, image sensors, image signal processors, or flashes.

The power management module 1588 may manage power supplied to the electronic device 1501. According to one embodiment, the power management module 1588 may be implemented as at least part of, for example, a power management integrated circuit (PMIC).

The battery 1589 may supply power to at least one component of the electronic device 1501. According to an embodiment, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more communication processors that are operable independently from the processor 1520 (e.g., the application processor (AP)) and supports a direct (e.g., wired) communication or a wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device via the first network 1598 (e.g., a short-range communication network, such as Bluetooth™, wireless-fidelity (Wi-Fi) direct, or infrared data association (IrDA)) or the second network 1599 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1592 may identify and authenticate the electronic device 1501 in a communication network, such as the first network 1598 or the second network 1599, using subscriber information (e.g., international mobile subscriber identity (IMSI)) stored in the subscriber identification module 1596.

The wireless communication module 1592 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1592 may support a high-frequency band (e.g., the mmWave band) to achieve, e.g., a high data transmission rate. The wireless communication module 1592 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1592 may support various requirements specified in the electronic device 1501, an external electronic device (e.g., the electronic device 1504), or a network system (e.g., the second network 1599). According to an embodiment, the wireless communication module 1592 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1597 may transmit or receive a signal or power to or from the outside (e.g., the external electronic device) of the electronic device 1501. According to an embodiment, the antenna module 1597 may include an antenna including a radiating element composed of a conductive material or a conductive pattern formed in or on a substrate (e.g., a printed circuit board (PCB)). According to an embodiment, the antenna module 1597 may include a plurality of antennas (e.g., array antennas). In such a case, at least one antenna appropriate for a communication scheme used in the communication network, such as the first network 1598 or the second network 1599, may be selected, for example, by the communication module 1590 (e.g., the wireless communication module 1592) from the plurality of antennas. The signal or the power may then be transmitted or received between the communication module 1590 and the external electronic device via the selected at least one antenna. According to an embodiment, another component (e.g., a radio frequency integrated circuit (RFIC)) other than the radiating element may be additionally formed as part of the antenna module 1597.

According to various embodiments, the antenna module 1597 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. Each of the electronic devices 1502 or 1504 may be a device of a same type as, or a different type, from the electronic device 1501. According to an embodiment, all or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, mobile edge computing (MEC), or client-server computing technology may be used, for example. The electronic device 1501 may provide ultra low-latency services using, e.g., distributed computing or mobile edge computing. In another embodiment, the external electronic device 1504 may include an internet-of-things (IoT) device. The server 1508 may be an intelligent server using machine learning and/or a neural network. According to an embodiment, the external electronic device 1504 or the server 1508 may be included in the second network 1599. The electronic device 1501 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1540) including one or more instructions that are stored in a storage medium (e.g., internal memory 1536 or external memory 1538) that is readable by a machine (e.g., the electronic device 1501). For example, a processor (e.g., the processor 1520) of the machine (e.g., the electronic device 1501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 16:
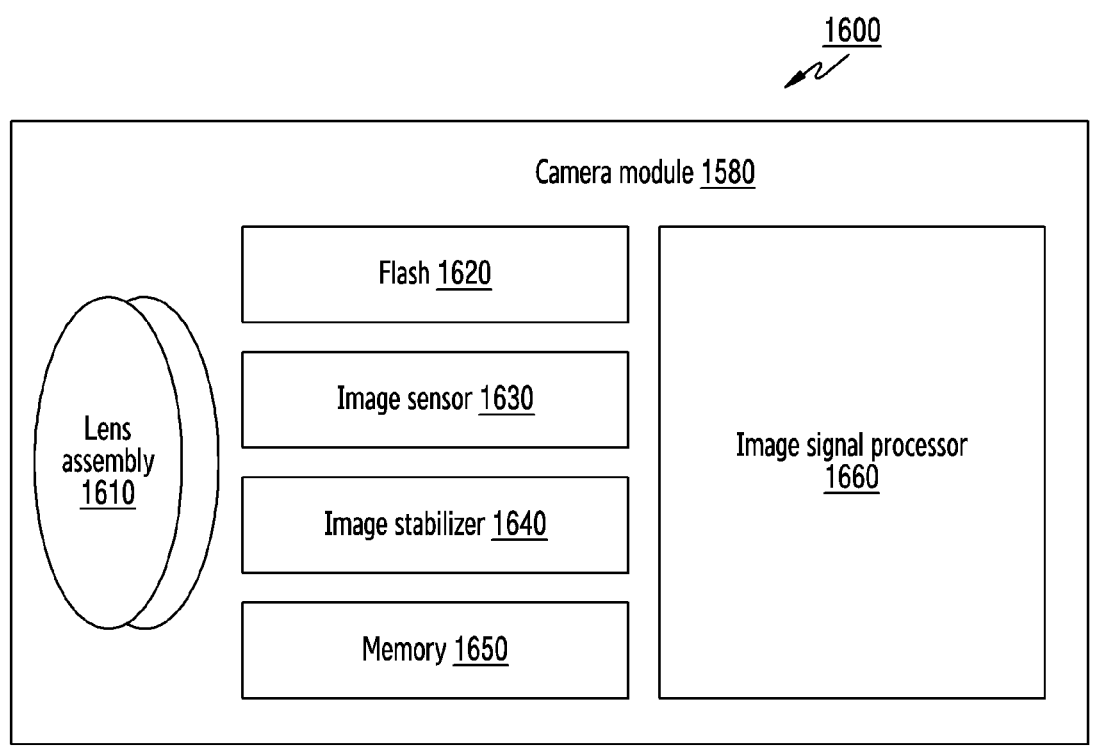
FIG. 16 is a block diagram illustrating a camera module according to various embodiments.

FIG. 16 is a block diagram 1600 illustrating the camera module 1580 according to various embodiments. Referring to FIG. 16, the camera module 1580 may include a lens assembly 1610, a flash 1620, an image sensor 1630, an image stabilizer 1640, memory 1650 (e.g., buffer memory), or an image signal processor 1660. The lens assembly 1610 may collect light emitted or reflected from an object whose image is to be taken. The lens assembly 1610 may include one or more lenses. According to an embodiment, the camera module 1580 may include a plurality of lens assemblies 1610. In such a case, the camera module 1580 may form, for example, a dual camera, a 360-degree camera, or a spherical camera. Some of the plurality of lens assemblies 1610 may have the same lens attribute (e.g., view angle, focal length, auto-focusing, f number, or optical zoom), or at least one lens assembly may have one or more lens attributes different from those of another lens assembly. The lens assembly 1610 may include, for example, a wide-angle lens or a telephoto lens.

The flash 1620 may emit light that is used to reinforce light reflected from an object. According to an embodiment, the flash 1620 may include one or more light emitting diodes (LEDs) (e.g., a red-green-blue (RGB) LED, a white LED, an infrared (IR) LED, or an ultraviolet (UV) LED) or a xenon lamp. The image sensor 1630 may obtain an image corresponding to an object by converting light emitted or reflected from the object and transmitted via the lens assembly 1610 into an electrical signal. According to an embodiment, the image sensor 1630 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1630 may be implemented using, for example, a charged coupled device (CCD) sensor or a complementary metal oxide semiconductor (CMOS) sensor.

The image stabilizer 1640 may move the image sensor 1630 or at least one lens included in the lens assembly 1610 in a particular direction, or control an operational attribute (e.g., adjust the read-out timing) of the image sensor 1630 in response to the movement of the camera module 1580 or the electronic device 1501 including the camera module 1580. This allows compensating for at least part of a negative effect (e.g., image blurring) by the movement on an image being captured. According to an embodiment, the image stabilizer 1640 may sense such a movement by the camera module 1580 or the electronic device 1501 using a gyro sensor (not shown) or an acceleration sensor (not shown) disposed inside or outside the camera module 1580. According to an embodiment, the image stabilizer 1640 may be implemented, for example, as an optical image stabilizer.

The memory 1650 may store, at least temporarily, at least part of an image obtained via the image sensor 1630 for a subsequent image processing task. For example, if image capturing is delayed due to shutter lag or multiple images are quickly captured, a raw image obtained (e.g., a Bayer-patterned image, a high-resolution image) may be stored in the memory 1650, and its corresponding copy image (e.g., a low-resolution image) may be previewed via the display module 1560. Thereafter, if a specified condition is met (e.g., by a user's input or system command), at least part of the raw image stored in the memory 1650 may be obtained and processed, for example, by the image signal processor 1660. According to an embodiment, the memory 1650 may be configured as at least part of the memory 1530 or as a separate memory that is operated independently from the memory 1530.

The image signal processor 1660 may perform one or more image processing with respect to an image obtained via the image sensor 1630 or an image stored in the memory 1650. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1660 may perform control (e.g., exposure time control or read-out timing control) with respect to at least one (e.g., the image sensor 1630) of the components included in the camera module 1580. An image processed by the image signal processor 1660 may be stored back in the memory 1650 for further processing, or may be provided to an external component (e.g., the memory 1530, the display module 1560, the electronic device 1502, the electronic device 1504, or the server 1508) outside the camera module 1580. According to an embodiment, the image signal processor 1660 may be configured as at least part of the processor 1520, or as a separate processor that is operated independently from the processor 1520. If the image signal processor 1660 is configured as a separate processor from the processor 1520, at least one image processed by the image signal processor 1660 may be displayed, by the processor 1520, via the display module 1560 as it is or after being further processed.

According to an embodiment, the electronic device 1501 may include a plurality of camera modules 1580 having different attributes or functions. In such a case, at least one of the plurality of camera modules 1580 may form, for example, a wide-angle camera and at least another of the plurality of camera modules 1580 may form a telephoto camera. Similarly, at least one of the plurality of camera modules 1580 may form, for example, a front camera and at least another of the plurality of camera modules 1580 may form a rear camera.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a camera module including:
      a lens assembly,
      a reflector configured to change a field of view by adjusting light incident toward the lens assembly,
      at least one Hall sensor configured to identify a position of the reflector, and
      a first memory configured to store a first correction value for correcting shading by the lens assembly;
   a second memory configured to:
      store reflector shading correction values for correcting shading by the reflector, wherein each of the reflector shading correction values has a different value depending on the position of the reflector, and
      store instructions for performing shading correction; and
   at least one processor electrically connected to the camera module and the second memory, wherein the at least one processor, when executing the instructions, is configured to:
      obtain a first image frame by driving the camera module,
      obtain first Hall data corresponding to the position of the reflector through the at least one Hall sensor while the first image frame is obtained through the camera module,
      obtain the first correction value from the first memory,
      obtain a second correction value corresponding to the first Hall data among the reflector shading correction values from the second memory, and
      perform shading correction on the first image frame based on the first correction value and the second correction value.

2. The device of claim 1, wherein the first correction value is calculated based on shading profile data corresponding to a brightness distribution of an image obtained when the position of the reflector is a first position.

3. The device of claim 1, wherein the second memory is further configured to:
   store each of the reflector shading correction values in a form of at least one of a shading correction function corresponding to the position of the reflector or a lookup table.

4. The device of claim 1, wherein each of the reflector shading correction values is a design value defined by a manufacturer of the electronic device.

5. The device of claim 1, wherein the at least one processor, when executing the instructions, is further configured to:
obtain a second image frame following the first image frame by driving the camera module,
obtain second Hall data corresponding to the position of the reflector through the at least one Hall sensor while the second image frame is obtained through the camera module,
obtain a third correction value corresponding to the second Hall data among the reflector shading correction values from the second memory, and
perform shading correction on the second image frame based on the first correction value and the third correction value.

6. The device of claim 1, wherein the reflector comprises at least one of a prism or a mirror.

7. The device of claim 1, further comprising a display electrically connected to the at least one processor,
wherein the at least one processor, when executing the instructions, is further configured to: display the first image frame on which the shading correction is performed as a preview on the display.

8. The device of claim 1, wherein the at least one processor, when executing the instructions, is further configured to store the first image frame on which the shading correction is performed in the second memory.

9. The device of claim 1, wherein the first memory is an electrically erasable programmable read-only memory (EEPROM).

10. The device of claim 1, wherein the second memory is a flash memory.

11. A method of operating an electronic device, the method comprising:
obtaining a first image frame by driving a camera module included in the electronic device;
obtaining first Hall data corresponding to a position of a reflector through at least one Hall sensor capable of identifying the position of the reflector included in the camera module while the first image frame is obtained through the camera module;
obtaining a first correction value for correcting shading by a lens assembly from a first memory included in the camera module;
obtaining a second correction value corresponding to the first Hall data among reflector shading correction values for correcting shading by the reflector from a second memory included in the electronic device; and
performing shading correction on the first image frame based on the first correction value and the second correction value.

12. The method of claim 11, wherein the first correction value is calculated based on shading profile data corresponding to a brightness distribution of an image obtained when the position of the reflector is a first position.

13. The method of claim 11, wherein each of the reflector shading correction values is stored in a form of at least one of a shading correction function corresponding to the position of the reflector or a lookup table.

14. The method of claim 11, further comprising:
obtaining a second image frame following the first image frame by driving the camera module;
obtaining second Hall data corresponding to the position of the reflector through the at least one Hall sensor while the second image frame is obtained through the camera module;
obtaining a third correction value corresponding to the second Hall data among the reflector shading correction values from the second memory; and
performing shading correction on the second image frame based on the first correction value and the third correction value.

15. The method of claim 11, further comprising:
storing the first image frame on which the shading correction is performed in the second memory.

16. An electronic device comprising:
a camera module, wherein the camera module comprises:
a lens assembly,
an actuator configured to perform optical image stabilization (OIS) and optical zoom by moving the lens assembly, the actuator being one or more coils that move the lens assembly in a direction perpendicular to optical axis to perform the OIS,
at least one Hall sensor configured to identify a position of the lens assembly, and
a first memory configured to store a first correction value for correcting shading by the lens assembly which is located at a reference position;
a second memory configured to store shading movement correction values and instructions for correcting shading that changes as the lens assembly is moved, wherein each of the shading movement correction values has a different value depending on the position of the lens assembly being moved in the direction perpendicular to the optical axis from the reference position according to the OIS is performed; and
at least one processor electrically connected to the camera module and the second memory, wherein the at least one processor, when executing the instructions, is configured to:
obtain a first image frame by driving the camera module,
obtain first Hall data corresponding to the position of the lens assembly through the at least one Hall sensor while the first image frame is obtained through the camera module,
obtain the first correction value from the first memory,
obtain a second correction value corresponding to the first Hall data among the shading movement correction values from the second memory, and
perform shading correction on the first image frame based on the first correction value and the second correction value.

17. The device of claim 16, wherein the first correction value is calculated based on shading profile data corresponding to a brightness distribution of an image obtained when the position of the lens assembly is the reference position.

18. The device of claim 16, wherein the first memory is an EEPROM.

19. The device of claim 16, wherein the second memory is a flash memory.

20. The device of claim 16, wherein the at least one processor, when executing the instructions, is further configured to:
obtain a second image frame following the first image frame by driving the camera module, obtain second Hall data corresponding to the position of the lens assembly through the at least one Hall sensor while the second image frame is obtained through the camera module, obtain a third correction value corresponding to the second Hall data among the shading movement correction values from the second memory, and perform shading correction on the second image frame based on the first correction value and the third correction value.

* * * * *